(12) United States Patent
Eyhorn

(10) Patent No.: US 11,250,710 B2
(45) Date of Patent: Feb. 15, 2022

(54) DRONE FLIGHT OPERATIONS

(71) Applicant: DroneSense LLC, Austin, TX (US)

(72) Inventor: Christopher Eyhorn, Austin, TX (US)

(73) Assignee: DroneSense LLC, Austin, TX (US)

(*) Notice: Subject to any disclaimer, the term of this patent is extended or adjusted under 35 U.S.C. 154(b) by 0 days.

(21) Appl. No.: 16/849,073

(22) Filed: Apr. 15, 2020

(65) Prior Publication Data

US 2020/0242949 A1 Jul. 30, 2020

Related U.S. Application Data

(63) Continuation of application No. 15/781,662, filed as application No. PCT/US2016/065837 on Dec. 9, 2016, now Pat. No. 10,657,827.

(Continued)

(51) Int. Cl.
*G08G 5/00* (2006.01)
*G08G 5/02* (2006.01)
(Continued)

(52) U.S. Cl.
CPC ......... *G08G 5/0039* (2013.01); *B64C 39/024* (2013.01); *G05D 1/106* (2019.05); *G08G 5/0013* (2013.01); *G08G 5/0026* (2013.01); *G08G 5/0034* (2013.01); *G08G 5/0069* (2013.01); *G08G 5/0082* (2013.01); *G08G 5/0091* (2013.01); *G08G 5/025* (2013.01); *B64C 2201/027* (2013.01); *B64C 2201/14* (2013.01);
(Continued)

(58) Field of Classification Search
CPC .. G08G 5/0039; G08G 5/0013; G08G 5/0034; G08G 5/0026; G08G 5/0069; G08G 5/0082; G08G 5/0091; G08G 5/025; G05D 1/106; B64C 39/924; B64C 2201/18; B64C 2201/027; B64C 2201/14; B64C 2201/141; G01S 13/933; G01S 13/93; G01S 15/89; G01S 17/933; G01S 13/89; G01S 7/003; G01S 17/89; G01S 13/86; G01S 13/913
See application file for complete search history.

(56) References Cited

U.S. PATENT DOCUMENTS 9,075,415 B2 7/2015 Kugelmass
2003/0043058 A1* 3/2003 Jamieson ............. G01S 17/933
340/961

(Continued)

OTHER PUBLICATIONS

International Search Report/Written Opinion dated Feb. 17, 2017 by the United States Patent Office as International Searching Authority, 12 pgs.

(Continued)

*Primary Examiner* — Marthe Y Marc-Coleman
(74) *Attorney, Agent, or Firm* — Fish & Richardson P.C.

(57) ABSTRACT

Methods, systems, and apparatus, including computer programs encoded on a computer storage medium, for sending a flight plan for execution by a drone, where the flight plan is adapted to a flight controller of the drone. Receiving flight data from the drone while the drone is executing the flight plan. Determining a modification to the flight plan based on the flight data received from the drone. Sending the modification to the flight plan to the drone while the drone is executing the flight plan, such that the drone executes the flight plan as modified by the modification.

19 Claims, 13 Drawing Sheets

Related U.S. Application Data

(60) Provisional application No. 62/264,970, filed on Dec. 9, 2015, provisional application No. 62/279,155, filed on Jan. 15, 2016, provisional application No. 62/301,728, filed on Mar. 1, 2016.

(51) Int. Cl.

| | | |
|---|---|---|
| *G05D 1/10* | (2006.01) | |
| *B64C 39/02* | (2006.01) | |
| *G01S 15/93* | (2020.01) | |
| *G01S 15/89* | (2006.01) | |
| *G01S 17/933* | (2020.01) | |
| *G01S 13/89* | (2006.01) | |
| *G01S 7/00* | (2006.01) | |
| *G01S 17/89* | (2020.01) | |
| *G01S 13/86* | (2006.01) | |
| *G01S 13/91* | (2006.01) | |
| *G01S 13/933* | (2020.01) | |

(52) U.S. Cl.
CPC .... *B64C 2201/141* (2013.01); *B64C 2201/18* (2013.01); *G01S 7/003* (2013.01); *G01S 13/86* (2013.01); *G01S 13/89* (2013.01); *G01S 13/913* (2013.01); *G01S 13/933* (2020.01); *G01S 15/89* (2013.01); *G01S 15/93* (2013.01); *G01S 17/89* (2013.01); *G01S 17/933* (2013.01)

(56) References Cited

U.S. PATENT DOCUMENTS

| | | |
|---|---|---|
| 2013/0345920 A1 | 12/2013 | Duggan et al. |
| 2014/0018979 A1 | 1/2014 | Goossen et al. |
| 2014/0249693 A1 | 9/2014 | Stark et al. |
| 2015/0120094 A1 | 4/2015 | Kimchi et al. |
| 2015/0336667 A1 | 11/2015 | Srivastava et al. |
| 2016/0068264 A1 | 3/2016 | Ganesh |
| 2016/0232794 A1 | 8/2016 | Hafeez et al. |
| 2016/0328979 A1 | 11/2016 | Postrel |
| 2018/0357909 A1 | 12/2018 | Eyhorn |

OTHER PUBLICATIONS

International Preliminary Report on Patentability for International Application No. PCT/US2016/065837, dated Jun. 21, 2018 by the United States Patent Office as International Searching Authority, 8 pgs.

\* cited by examiner

DRONE FLIGHT OPERATIONS

CROSS-REFERENCE TO RELATED APPLICATIONS

This application is a continuation of U.S. application Ser. No. 15/781,662, filed on Jun. 5, 2018, which is a U.S. National Phase Application of International Patent Application No. PCT/US2016/065837 filed on Dec. 9, 2016, which claims the benefit of the filing date of U.S. Provisional Application No. 62/264,970, filed on Dec. 9, 2015; U.S. Provisional Application No. 62/279,155, filed on Jan. 15, 2016; and U.S. Provisional Application No. 62/301,728, filed on Mar. 1, 2016. The contents of above-referenced applications are incorporated herein by reference in their entirety.

BACKGROUND

Unmanned aerial vehicles (UAV), or "drones," are increasingly used in various applications including commercial, farming, scientific, search and rescue, law enforcement, environmental conservation, and recreational applications. Drones can be controlled either autonomously (e.g., by onboard computers) or by a pilot using a remote control unit.

SUMMARY

Implementations of the present disclosure include methods for executing a drone flight plan from a drone flight control platform. In some implementations, methods include actions of sending a flight plan for execution by a drone, where the flight plan is adapted to a flight controller of the drone. Receiving flight data from the drone while the drone is executing the flight plan. Determining a modification to the flight plan based on the flight data received from the drone. Sending the modification to the flight plan to the drone while the drone is executing the flight plan, such that the drone executes the flight plan as modified by the modification. Other implementations of this aspect include corresponding systems, apparatus, and computer programs, configured to perform the actions of the methods, encoded on computer storage devices.

These and other implementations can each optionally include one or more of the following features. In some implementations, the flight plan can be agnostic to different types of drone flight controllers, and the method can include converting the flight plan from an agnostic flight plan to a drone specific flight plan by adapting the agnostic flight plan to the flight controller of the drone. Sending the flight plan for execution by the drone can include sending the drone specific flight plan to the drone.

In some implementations, the flight plan can include one or more of sensor operations for a sensor package of the drone, a task, a plurality of waypoints, and a flight profile between waypoints.

In some implementations, the flight profile can include one or more of flight times between waypoints, drone speed between waypoints, drone altitude between waypoints, drone flight attitude, expected battery state's, sensor configurations, and sensor operations.

In some implementations, the method includes receiving pre-flight data, determining that the drone cannot complete at least a portion of the flight plan based on the pre-flight data, generating a modified flight plan based on the flight plan and the pre-flight data, and sending the modified flight plan to the drone.

In some implementations, the pre-flight data can include one or more of a location of the drone, battery status of the drone; environment data, and airspace data.

In some implementations, the method includes receiving other data that affects the drone flight plan, determining a second modification to the flight plan based on third-party data, and sending the second modification to the flight plan to the drone while the drone is executing the flight plan, such that the drone executes the flight plan as modified by the second modification.

In some implementations, the other data can include one or more of weather data or airspace data.

In some implementations, the method includes sending a second flight plan for execution by a second drone, the second flight plan being adapted to a flight controller of the second drone, where the flight plan and the second flight plan coordinate the flights of the drone and the second drone within a location. The flight controller of the second drone can be different from the flight controller of the drone.

In some implementations, the second flight plan can be agnostic to different types of drone flight controllers. The method can include converting the second flight plan from an agnostic flight plan to a second drone specific flight plan by adapting the agnostic flight plan to the flight controller of the second drone. Sending the second flight plan for execution by the second drone can include sending the second drone specific flight plan to the second drone.

In some implementations, the method can include determining a modification to the second flight plan based on the modification to the flight plan, and sending the modification to the second flight plan to the second drone while the second drone is executing the second flight plan, such that the second drone executes the second flight plan as modified by the modification to the second flight plan.

In some implementations, the flight data can include one or more of battery status, drone speed, drone altitude, drone location, and sensor data.

In some implementations, the modification to the flight plan can include adding or removing a waypoint.

In some implementations, the modification to the flight plan can include altering a geographic location of a waypoint.

In some implementations, the modification to the flight plan can include altering a flight profile between waypoints.

In some implementations, the method can include providing a graphical interface including a representation of at least a portion of the flight data from the drone, for display to a user and concurrently with the drone executing the flight plan.

In some implementations, the representation can include a representation of one or more of a location of the drone, a battery status of the drone, a speed of the drone, and sensor data from the drone.

This specification also relates to controlling drone approaches to target locations. Implementations of the present disclosure generally relate to controlling drone ascent and descent to and from a flight corridor (e.g., flight in a "drone highway"). Implementations also relates to a device for guiding drone approaches to target locations. Implementations of the present disclosure relate to defining a drone approach corridor and guiding drone ascent and descent to and within the approach corridor from a flight corridor. More particularly, implementations of the present disclosure are directed to a device for guiding drone ascents from and descents to geographic locations within predefined drone approach corridors.

In general, innovative aspects of the subject matter described in this specification can be embodied in methods for controlling drone approaches to target locations that include the actions of receiving a request for a drone to enter a drone approach corridor to a geographic location, where a drone approach corridor is a defined volume of airspace extending from an area above the geographic location to the geographic location. Determining whether the drone approach corridor is available for the drone to enter. Sending a response that grants or denies permission for the drone to enter the drone approach corridor based on the determination of whether the drone approach corridor is available for the drone to enter. Other implementations of this aspect include corresponding systems, apparatus, and computer programs, configured to perform the actions of the methods, encoded on computer storage devices.

In another general aspect, the subject matter described in this specification can be embodied in a system for controlling drone approaches to target locations. The system includes one or more data stores that store data defining a plurality of drone approach corridors, and one or more computing devices coupled to the data stores and that host a drone control platform configured to control drone usage of the plurality of drone approach corridors. Each drone approach corridor is defined by a designated volume of airspace that extends from an area above a respective geographic location to the respective geographic location. In some implementations, the drone control platform can control drone usage of the plurality of drone approach corridors by receiving a request for a drone to enter a drone approach corridor, determining whether the drone approach corridor is available for the drone to enter, and sending a response that grants or denies permission for the drone to enter the drone approach corridor based on the determination of whether the drone approach corridor is available for the drone to enter.

These and other implementations can each optionally include one or more of the following features. In some implementations, the drone approach corridor can extend from a drone highway to the geographic location.

In some implementations, determining whether the drone approach corridor is available for the drone to enter can include determining that the drone approach corridor is available for the drone to enter, and the response grants permission for the drone to enter the drone approach corridor and includes data defining boundaries of the drone approach corridor.

In some implementations, the drone approach corridor can include collision avoidance protocols, and the response includes data defining the collision avoidance protocols. In some implementations, the collision avoidance protocols can include a stand-off distance from a ground obstruction located at the geographic location.

In some implementations, the methods can include receiving sensor data from the drone that is captured while the drone is flying in the drone approach corridor. Determining that the drone approach corridor should be modified based on the sensor data, and modifying a boundary of the drone approach corridor.

In some implementations, determining that the drone approach corridor should be modified can include determining, from the sensor data, that there is an obstruction in at least a portion of the drone approach corridor.

In some implementations, determining whether the drone approach corridor is available for the drone to enter can include determining that the drone approach corridor is available for the drone to enter by determining that another drone is not present in the drone approach corridor.

In some implementations, determining whether the drone approach corridor is available for the drone to enter can include determining that the drone approach corridor is available for the drone to enter by: determining a time period that the drone is pre-schedule to enter the drone approach corridor, and determining that a time of the request is within the time period.

In some implementations, determining whether the drone approach corridor is available for the drone to enter can include determining that the drone approach corridor is available for the drone to enter by determining that another drone is not pre-scheduled to use the drone approach corridor within a period of time from a time of the request.

In some implementations, determining whether the drone approach corridor is available for the drone to enter can include determining that the drone approach corridor is not available for the drone to enter by determining that another drone is pre-scheduled to use the drone approach corridor within a period of time from a time of the request.

In some implementations, determining whether the drone approach corridor is available for the drone to enter can include determining that the drone approach corridor is not available for the drone to enter by determining that the drone approach corridor is obstructed.

In some implementations, determining whether the drone approach corridor is available for the drone to enter can include determining that the drone approach corridor is not available for the drone to enter, and the response can identify a holding pattern for the drone to fly while awaiting permission to enter the drone approach corridor.

In some implementations, determining whether the drone approach corridor is available for the drone to enter can include determining that the drone approach corridor is not available for the drone to enter, and the response can identify a secondary drone approach corridor for the drone to enter.

In some implementations, the methods can include sending instructions to the drone to control the flight of the drone in accordance with the response.

In some implementations, the instructions can include instructions to enter the drone approach corridor.

In some implementations, the instructions can include instructions to fly a holding pattern.

In some implementations, the instructions can include instructions to enter a secondary drone approach corridor.

In general, innovative aspects of the subject matter described in this specification can be embodied in methods for configuring an autonomous drone landing device (ADLD) that include the actions of receiving sensor data that represents airspace above an ADLD, orientation data that indicates an orientation of a landing pad associated with an ADLD, and location data that indicates a geographic location of the ADLD. Determining attributes to define a drone approach corridor based on the sensor data, the orientation data, and the location data. Registering the ADLD with a drone control platform. This and other implementations can each optionally include one or more of the following features.

In some implementations, the drone approach corridor can extend from a drone highway to the landing pad associated with the ADLD.

In some implementations, the sensor data can include one or more images of the airspace.

In some implementations, the methods can include determining that the airspace above the ADLD is obstructed based on the sensor data and alerting a user that the airspace above the ADLD is obstructed in response to determining that the airspace above the ADLD is obstructed.

In some implementations, alerting the user that the airspace above the ADLD is obstructed includes providing, for display on a user computing device, a notification that the airspace above the ADLD is obstructed and instructions for the user to relocate the ADLD.

In some implementations, the notification includes a graphical representation of a location of the obstruction with respect to the ADLD and a direction for the user to move the ADLD away from the obstruction.

In some implementations, alerting the user that the airspace above the ADLD is obstructed includes activating an indicator on the ADLD to notify the user that the airspace above the ADLD is obstructed and to indicate a direction in which to move the ADLD away from the obstruction.

In some implementations, the methods can include determining, based on the orientation data, that the landing pad is not properly oriented for a drone to land on the landing pad, and alerting a user that the landing pad is not properly oriented in response to determining that the landing pad is not properly oriented.

In some implementations, alerting the user that the landing pad is not properly oriented includes providing, for display on a user computing device, a notification that the landing pad is not properly oriented and instructions for the user to correct the orientation of the landing pad.

In some implementations, the notification includes a graphical representation of a present orientation of the landing pad and a corrected orientation for the landing pad to guide the user in correcting the orientation of the landing pad.

In some implementations, alerting the user that the landing pad is not properly oriented includes activating an indicator on the ADLD to notify the user that the landing pad is not properly oriented and to indicate a direction in which to move ADLD in order to correct the orientation of the landing pad.

In some implementations, registering the ADLD with a drone control platform includes sending, to the drone control platform, data identifying the ADLD and data defining the drone approach corridor associated with the ADLD.

In some implementations, the data identifying the ADLD includes a serial number, a location of the ADLD, and an identity of a second ADLD to serve as a secondary ADLD for the ADLD.

In some implementations, the methods can include sending signals from the ADLD to the drone control platform that indicate that the ADLD is functioning properly after registering the ADLD.

In some implementations, the methods can include, after registering the ADLD: determining that the airspace above the ADLD, and sending a notification to the drone control platform indicating that at least a portion of the drone approach corridor associated with the ADLD is unavailable for drones to enter in response to determining that the airspace above the ADLD is obstructed.

In another general aspect, the subject matter described in this specification can be embodied in methods for coordinating a drone approach to a landing site with an autonomous drone landing device (ADLD) that include the actions of receiving an indication that a drone has entered an airspace associated with an ADLD, the airspace being defined, in part, by a boundary. Receiving first data from a sensor of the ADLD that is configured to monitor the airspace associated with the ADLD. Determining, based on the first data, a position of the drone with respect to the boundary of the airspace associated with the ADLD. Communicating second data to the drone to guide the drone's flight within the airspace based on the determined position of the drone with respect to the boundary of the airspace. These and other implementations can each optionally include one or more of the following features.

In some implementations, the airspace can be a drone approach corridor.

In some implementations, the drone approach corridor can extend from a drone highway to a landing pad associated with the ADLD.

In some implementations, the methods can include determining that an object is within a threshold distance of a landing pad associated with the ADLD, and the second data can include instructions for the drone to stop an approach to the landing pad.

In some implementations, the methods can include causing a warning device to be activated on the ADLD in response to receiving the indication that a drone has requested to land at a landing pad associated with the ADLD.

In some implementations, the warning device can produce a visible or an audio warning of an approaching drone.

In some implementations, the methods can include sending a landing notification to a user's computing device in response to receiving the indication that a drone has requested to land at a landing pad associated with the ADLD.

In some implementations, the methods can include determining, based on the position of the drone with respect to the boundary of the airspace, a course correction for the drone, and the second data can include instructions for the drone to perform the course correction.

In some implementations, the second data can be communicated to the drone by radio frequency communications.

In some implementations, the second data can be communicated to the drone through a drone control platform.

In some implementations, the second data can be communicated to the drone by lighting configurations on a landing pad.

In some implementations, the first data includes one or more images of the airspace, and determining the position of the drone with respect to the boundary of the airspace includes identifying the drone within the one or more images, and determining the position of the drone with respect to the boundary of the airspace within the one or more images.

In some implementations, the first data includes radio frequency triangulation data, and determining the position of the drone with respect to the boundary of the airspace includes determining the position of the drone with respect to the boundary of the airspace using on radio frequency triangulation techniques.

In another general aspect, the subject matter described in this specification can be embodied in an autonomous drone landing device (ADLD) that includes one or more processors, a data store coupled to the one or more processors having instructions stored thereon for execution by the one or more processors, a sensor coupled to the one or more processors, and configured to monitor airspace above the ADLD, a warning device coupled to the one or more processors, and configured to alert bystanders of an approaching drone; and one or more communication interfaces coupled to the one or more processors, and configured to communicate with a drone control platform and a drone. This and other implementations can each optionally include one or more of the following features.

In some implementations, the instructions cause the one or more processors perform the operations of any one or more of the above methods for configuring an ADLD.

In some implementations, the instructions cause the one or more processors perform the operations of any one or more of the above methods for coordinating a drone approach to a landing site with an ADLD.

In some implementations, the ADLD includes a landing pad coupled to the ADLD.

In some implementations, the sensor is a first sensor, and the ADLD comprises a second sensor coupled to the one or more processors, and configured to detect an orientation of a landing pad associated with the ADLD.

In some implementations, the landing pad includes a drone charging station.

In some implementations, the charging station is a wireless charging station.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is to say that methods in accordance with the present disclosure are not limited to the combinations of aspects and features specifically described herein, but also include any combination of the aspects and features provided.

The details of one or more embodiments of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
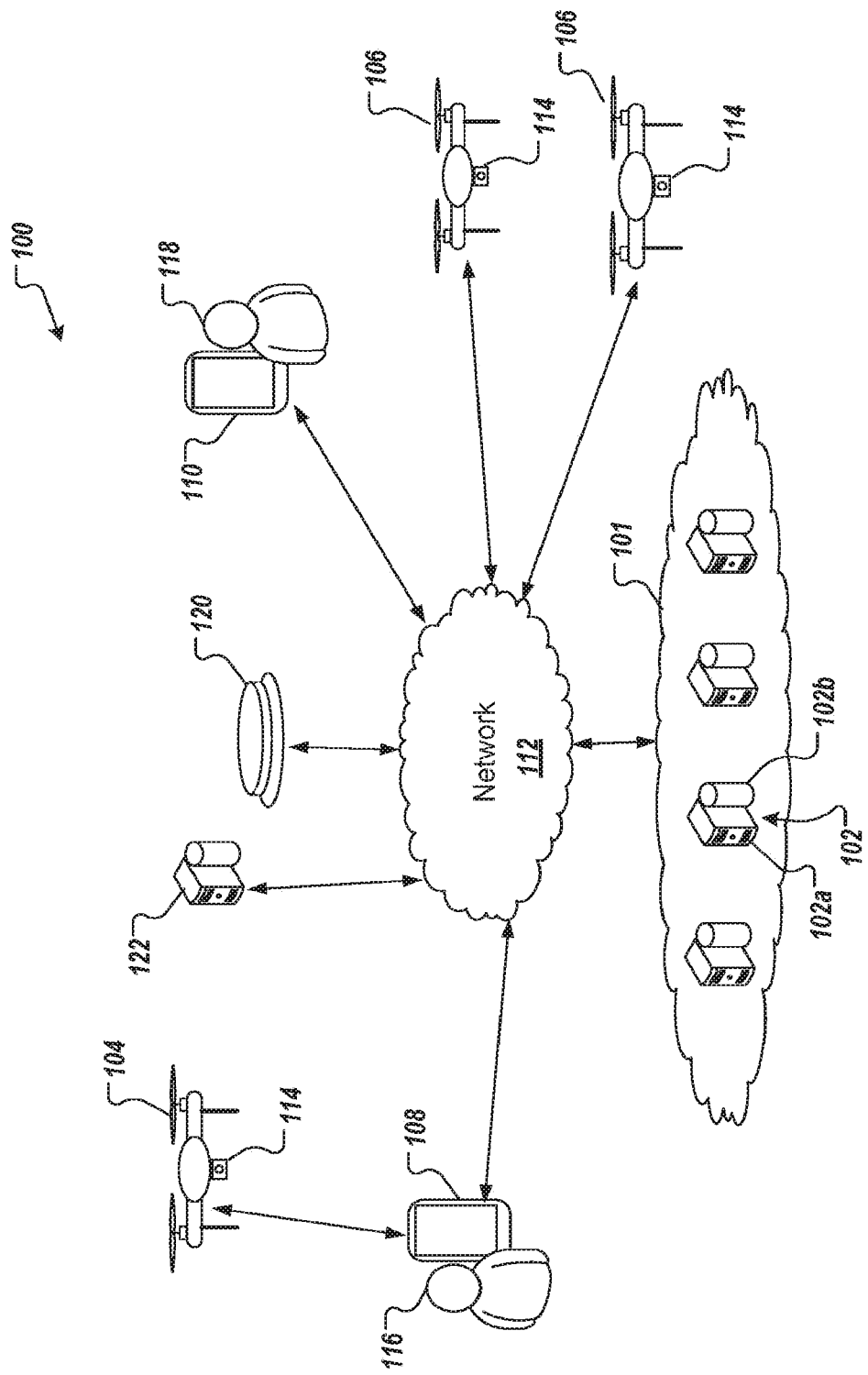
FIG. 1 depicts an example system in accordance with implementations of the present disclosure.

Implementations of the present disclosure generally relate to controlling drone ascent and descent to and from a flight corridor (e.g., flight in a "drone highway"). More particularly, implementations of the present disclosure are directed to coordinating safe drone ascents from and descents to geographic locations within predefined drone approach corridors. In some examples, implementations of the present disclosure may enable drones to descend to and ascend from geographic locations with reduced or no reliance on onboard sensors to detect and avoid obstacles. More particularly, implementations of the present disclosure are directed to an autonomous drone landing device (ADLD) that can be used to guide a drone from flight corridor to a landing location. In some examples, an ADLD can guide a drone's approach to a landing location along a drone approach corridor. In some examples, the ADLDs can interface with a cloud-based drone control platform (also referred to herein as the platform) to coordinate drone flights and approaches between multiple locations. For example, an autonomous drone landing system (ADLS) including one or more ADLDs in communication with a drone control platform may facilitate increased commercial uses for drones including, for example, drone-based object delivery.

In some implementations, a drone approach corridor is defined as a volume of airspace extending from an area above a target location (e.g., a ground-level location, a rooftop location) to the target location. In some examples, the area above the target location includes a flight corridor (also referred to herein as a drone highway). In some examples, the flight corridor is a higher speed, higher altitude drone flight path relative to a drone approach corridor. In some examples, a drone approach corridor is defined as a volume of airspace extending from a drone highway to the target location.

In some implementations, an ADLD is an electronic device that can be placed at a drone landing location. In some examples, the ADLD includes a flat surface on which a drone can land (e.g., a drone landing pad). The ADLD includes an electronic communication interface (e.g., WiFi or LTE) to communicate with a drone control platform and, in some examples, drones. The ADLD can communicate with the platform through a computer network. In addition, the ADLD includes a sensor package to guide drone landing approaches along an approach corridor to the ADLD. The sensor package can include, for example, an imaging sensor (e.g., a camera, radar, sonar), infrared sensors (e.g., light sources and detectors), orientation sensors, location sensors (e.g., global positioning system (GPS), WiFi positioning system (WPS)), visual indicators (e.g., LEDs), and audible indicators.

In some implementations, the ADLD establishes a drone approach corridor during a configuration phase. For example, when a user first places an ADLD at a desired drone landing location (e.g., on a building, in a yard) and powers on the ADLD, the ADLD can initiate a configuration process. During the configuration process, the ADLD can perform several diagnostic checks to, for example, verify the airspace above the ADLD is free of obstructions (e.g., absence of tree branches, powerlines, etc.), establish a drone approach corridor, verify that the drone landing pad is sufficiently level for a drone to land, and/or determine the geographic location of the ADLD (e.g., latitude, longitude, altitude). For example, the ADLD can obtain an image of the airspace above the ADLD (e.g., using an imaging sensor). The ADLD can analyze the image to verify that there are no obstructions (e.g., power lines, tree branches) in the airspace between the ADLD and a drone highway above the ADLD. In some examples, the ADLD can use radar or sonar (e.g., transceivers or transducers) to detect obstructions in a region of airspace above the ADLD. In some examples, the ADLD can check the airspace for obstructions within a defined volume of airspace. If there are no obstructions, the ADLD can define the volume of airspace as a new drone approach corridor. If there are obstructions within the volume of airspace, the ADLD can notify the user of the obstructions. In some examples, the ADLD can provide the user with an image (or other means of feedback) of the airspace including an annotation identifying the obstruction. For example, the ADLD can send the notification and image to the user's computing device or display the image on a display of the ADLD. In some examples, the ADLD can verify its orientation to determine whether the landing pad is sufficiently level for a drone to land. For example, the ADLD can determine based on orientation sensor data whether the ADLD is sufficiently level for a drone to land on the landing pad. If not, the ADLD can notify the user and the user can level the ADLD.

In some implementations, the ADLD can register with the drone control platform, for instance, to confirm that the ADLD is ready to receive drones. For example, after the ADLD completes the configuration phase, it can register its location with the drone control platform. For example, an ADLD can register with the drone control platform by sending characteristic data related to the ADLD and an associated drone approach corridor to the drone control platform. The drone control platform can use the ADLD characteristic data to coordinate drone approaches and landings with the ADLD. For example, the ADLD characteristic data can include a unique identifier assigned to the ADLD (e.g., a serial number), the location of the ADLD, and data defining a drone approach corridor for landing drones at the ADLD (e.g., location and boundaries of the corridor).

In addition, the ADLD can guide drone landing approaches to the ADLD's landing pad. For example, a drone can request to enter a drone approach corridor defined by the ADLD. In some examples, the drone can send a request to enter the drone approach corridor to the drone control platform. The drone control platform can monitor the status of the ADLD (e.g., whether the ADLD is online, obstructed, or currently has another drone landing) and either grant or deny the request. If the request is granted, either the drone control platform or the drone itself can indicate to the ADLD when the drone enters the drone approach corridor.

The ADLD can guide the drone along the approach corridor to the landing pad once the drone's request is granted and the drone enters the ADLD's approach corridor. For example, the ADLD can identify the drone's position within the corridor using an imaging sensor (e.g., camera, radar, or sonar), and issue appropriate course corrections to the drone to guide it along the corridor. For example, the ADLD can determine from images of the drone's horizontal position within the corridor that the drone is approaching a boundary of the corridor and issue appropriate course corrections to the drone to re-center the drone in the corridor. In some examples, the ADLD can use other position finding techniques to locate the drone within the approach corridor and guide it to the landing pad (e.g., radio frequency (RF) triangulation techniques, such as WiFi positioning). The ADLD can issue the course corrections, for example, either through direct communication with the drone (e.g., WiFi, RF, infrared (IR), Bluetooth) or through the drone control platform. In some examples, the ADLD can include an IR camera and the drone can include IR light sources. The ADLD can detect the location of the drone based on the location of the drone's IR light sources in an image of the approach corridor, and issue course corrections as appropriate.

In some implementations, the ADLD can illuminate landing guidance lights (e.g., IR lights at the perimeter of the landing pad) to guide the drone to the landing pad. For example, the drone can include infrared sensors (e.g., an IR camera) and can use the landing guidance lights to determine its position within the approach corridor. In some examples, the landing guidance lights can be used in conjunction with the course corrections from the ADLD.

In some implementations, the ADLD can provide ADLD status updates to the drone control platform. For example, the ADLD can detect if the landing pad or drone approach corridor becomes obstructed and inform the drone control platform. In such situations, the drone control platform can deny all drone requests to land at the ADLD until the obstruction is cleared. In addition, the ADLD or the drone control platform can notify a user that the ADLD is obstructed so that the user can remove the obstruction. In some examples, a user can provide a backup landing area for drones if the user's ADLD becomes obstructed or otherwise inoperable. For example, a user can designate another ADLD that is registered with the drone control platform (e.g., a neighbor's ADLD) as a backup landing location and approach corridor. If the user's ADLD becomes obstructed the drone control platform can reroute drones that request to land at the user's landing location to the designated backup ADLD.

In some implementations, the ADLD includes visual and/or audible indicators to alert bystanders that a drone entering the drone approach corridor and will be landing. Visual indicators can include, for example, lights (e.g., flashing LEDs), and audible indicators can include, for example, a siren, alarm, or verbal messages. For example, when the ADLD receives an indication that a drone is entering the drone approach corridor, the ADLD can initiate the visual or audible indicators to alert bystanders of the approaching drone. In some implementations, the ADLD includes a proximity sensor to detect when an object (e.g., a person, animal) is within a threshold distance (e.g., a safety distance) of the ADLD during a drone ascent or descent. For example, if the ADLD detects an object within a safety area, the ADLD can instruct a descending drone to stop an approach to the landing pad. For example, the ADLD can instruct the drone to abort the descent, exit the drone approach corridor, hover until the object (e.g., person) leaves the safety area, or re-route the drone to a secondary ADLD.

In some implementations, ADLD communications with drones are agnostic to drone flight controllers. For example, the ADLD can include adapters that enables it to communicate course corrections to any drone flight controller in a format that can be executed by the flight controllers.

In some implementations, an ADLD can include a drone charging station integrated with the landing pad so that a drone that lands at the landing pad can be recharged. For example, the charging station can be a wireless power transfer device (e.g., a wireless charging station).

In some implementations, the drone control platform is used to coordinate access to an approach corridor by a single drone, or multiple drones. In some examples, a drone control platform uses an entry request protocol to coordinate drone entry into and ascents/descents within a drone approach corridor. For example, a drone may not be permitted to enter a drone approach corridor until the drone requests to perform an approach (e.g., ascent, descent) in the particular drone corridor and the request is granted by the platform. In some examples, if a first drone has received permission to perform an approach in a particular drone approach corridor, and a second drone requests to enter the same corridor, the drone control platform will deny the second drone's request. In some examples, the drone control platform can define a holding pattern for the second drone that is outside the drone highway.

In some implementations, the drone control platform coordinates the use of drone approach corridors in advance of a drone request to perform an approach in a particular corridor. For example, the drone control platform can schedule multiple drone approaches for a drone approach corridor in advance of each drone actually requesting entry into a drone approach corridor. For example, the platform can coordinate drone flight plans such that multiple drones arrive at a particular drone approach corridor at different times. In some examples, the drone arrival times at an approach corridor can be sufficiently spaced, such that each drone has sufficient time to descend, perform one or more tasks, and ascend prior to a second drone reaching the drone approach corridor. In some examples, the drone control platform can coordinate drone arrival times at a drone approach corridor by modifying characteristics of each drone's flight plan (e.g., takeoff times, airspeed, waypoints, charge locations, intervening tasks, etc.).

In some implementations, collision avoidance protocols are defined for drones to avoid ground obstructions within or near a drone approach corridor (e.g., power lines, tree branches, animals, people). Collision avoidance protocols can include, for example, defined boundaries of the drone approach corridor, drone size limitations for a particular corridor, drone performance limitations for a particular corridor, environmental limitations (e.g., wind speed) for entering a corridor, standoff distances from obstructions inside or outside the corridor, speed limits (e.g., descent/ascent rate limits) within the corridor, and battery state restrictions within the corridor (e.g., required minimum charge level to takeoff or enter the corridor). In some examples, the collision avoidance protocols can include a set of flight parameters that control the flight of a drone so that the drone can navigate a drone approach corridor with minimal or no reliance on onboard sensors to detect and avoid objects near the target location (e.g., trees, buildings, power lines, etc.).

In some implementations, the drone control platform can control drone flights in one or more of three flight stages: a pre-flight stage, an in-flight stage, and a post-flight stage. During the pre-flight stage, the platform receives data defining flight tasks for a drone. The data can include, for example, a sensor package already installed on the particular drone, mechanical features of the particular drone (e.g., motor type/size, airframe configuration, battery type/size, etc.), one or more geographical locations for a drone flight (e.g., latitude and longitude), and one or more tasks to be performed by a drone (e.g., surveying an area of land, delivering an object, performing sensor measurements, etc.). In some examples, geographical locations for a drone flight can include a takeoff position, a landing position, and, optionally, one or more waypoints. In some examples, the geographic location for a drone flight can be a geographic area (e.g., a set of geographic coordinates defining a flight area). For example, the geographic area can be an area for the drone to survey.

The platform uses the flight task data to generate a flight plan for a drone. The flight plan can include, for example, a type of drone to perform the flight, a sensor package for the drone (e.g., a sensor package to be installed on the drone to perform the flight tasks), a plurality of waypoints, and/or a flight profile between waypoints. In some examples, the flight profiles can include, for example, expected flight time between waypoints, drone speed between waypoints, drone altitude, expected drone flight attitude (e.g., an orientation angle of the drone with respect to the horizon), expected battery state (e.g., charge level), and sensor configurations/operations. In some examples, the platform obtains environmental data (e.g., geographic data, weather data) associated with the drone flight location, drone performance metrics (e.g., from historical flight data), and/or sensor performance metrics. The platform can use the environmental data, drone performance metrics, and/or sensor performance metrics in combination with the flight task data to generate a drone flight plan for a particular task. For example, the platform can select an appropriate drone and sensor package for particular task based on the task, the drone performance metrics, and the environmental data.

During the in-flight stage, the platform sends the flight plan to the selected drone and monitors drone flight data while the drone executes the flight plan. For example, in some implementations, the entire flight plan can be transmitted to a drone (e.g., through a communication interface on the drone) and the drone can automatically execute the flight plan. In some implementations, the platform sends control signals to the drone to execute the flight plan. In either case, the platform receives drone flight data while the drone executes the flight plan. The drone flight data can include, for example, battery status, speed, altitude, location data (e.g., GPS data), sensor data (e.g., data obtained by the drone's sensor package such as camera images). In some examples, the drone flight data can include requests to enter drone approach corridors. The platform can modify the flight plan based on the drone flight data and send flight plan updates to the drone while the drone is in-flight.

In some implementations, the platform receives pre-flight diagnostic data from the drone before the drone begins executing the flight plan (e.g., within minutes or seconds before the drone begins executing the flight plan). For example, pre-flight diagnostic data can include the location of the drone, battery status, motor status, and other appropriate data. In addition, the platform can obtain environmental data and airspace data before the drone begins execution of the flight plan. The platform can verify the flight plan based on the diagnostic data and/or the environment and airspace data, and, if necessary, modify the flight plan and send appropriate updates to the drone. For example, if the drone's battery charge is less than required for the complete flight plan, the platform can modify the flight plan accordingly. As another example, if the drone's battery charge is less than required for the complete flight plan, the platform can communicate with an operator of the drone to instruct the operator to charge the battery, or change the battery. As another example, if the drone is located at a position other than the takeoff point of the flight plan the platform can modify the flight plan accordingly. For example, if another aircraft or drone is located in the area, the platform can delay or modify the flight plan. As another example, if a different drone is delayed in a drone approach corridor that a drone undergoing pre-flight diagnostics is expecting to use, the platform can modify the flight plan for the pre-flight drone accordingly. For example, the take-off time of the drone undergoing pre-flight diagnostics can be delayed to ensure the other drone will be clear of the approach corridor.

In some examples, the drone control platform can receive drone approach corridor entry requests from drones that are not controlled by the platform or drones operating in accordance with flight plans that have not been generated by the drone control platform. For example, a drone requesting to enter a drone approach corridor may be controlled by or operating in accordance with a flight plan generated by a drone control system different from the drone control platform. In such an example, when granting access to a drone approach corridor, the drone control platform can provide a temporary flight plan to the drone that defines, for example, a flight path, approach to, and collision avoidance protocols for entry into the approach corridor.

At the post-flight stage, the platform can analyze the drone flight data and sensor data (e.g., data obtained by the drone's sensor package). The drone flight data can be used to build historical profiles of the type of drone used (e.g., drone performance metrics) and the location of the flight (e.g., ground topography). In some examples, the drone flight data can be used to modify drone approach corridors (e.g., boundaries, collision avoidance protocols, etc.). In some examples, the original flight plan can be compared with the flight data to evaluate the drone's performance and infer drone performance metrics about the particular drone and/or the type of drone used. The sensor data can be analyzed and used to generate flight deliverables for a user (e.g., an image survey of an area of land, sensor data reports, etc.) In some examples, the sensor data and drone flight data can be used to evaluate the execution of the flight, for example, whether all of the data required by a flight task was obtained. If the task was not completed, the flight data and sensor data can be used to generate additional flight plans to complete the task.

FIG. 1 depicts an example system 100 that can execute implementations of the present disclosure. The example system 100 includes a computing cloud 101 that includes one or more computing systems 102, one or more drones, such as drones 104, 106, one or more computing devices, such as computing devices 108, 110, and one or more ADLDs 120. The example system 100 further includes a network 112. The network can include a large network or combination of networks, such as a local area network (LAN), wide area network (WAN), the Internet, analog or digital wired and wireless telephone networks (e.g., 4G and Long-Term Evolution (LTE) networks), a satellite network, one or more wireless access points, or any appropriate combination thereof connecting any number of mobile clients, fixed clients, drones, and servers.

The computing systems 102 each include a computing device 102a and computer-readable memory provided as a persistent storage device 102b, and can represent various forms of server systems including, but not limited to a web server, an application server, a proxy server, a network server, or a server farm. For example, the computing systems 102 can host a drone control platform.

The drones 104, 106 can each include various types of UAVs including autonomously controlled or remotely controlled UAVs. In some examples, the drones 104, 106 can include a communications interface. In some examples, the drones 104, 106 to communicate with the computing systems 102 and the computing devices 108, 110 either directly or through the network 112. In some examples, the drones 104, 106 can receive control signals from the computing systems 102 or the computing devices 108, 110.

The drones 104, 106 can include flight controllers (e.g., 3DR APM, 3DR Pixhawk, DJI A2, DJI Ace One, DJI Naza-M V2, DJI WooKong). The drone's 104, 106 flight controller can control the drone's 104, 106 propulsion systems and control surfaces to execute flight plans. In addition, the drones 104, 106 can include a sensor package 114. The sensor package 114 can include, but is not limited to, navigation sensors (e.g., GPS receivers), cameras, environmental sensors, surface mapping sensors, and object delivery equipment.

The computing devices 108, 110 are associated with respective users 116, 118. In some examples, the computing devices 108, 110 can each include various forms of a processing device including, but not limited to, a drone remote control unit, a desktop computer, a laptop computer, a tablet computer, a wearable computer, a handheld computer, a personal digital assistant (PDA), a cellular telephone, a network appliance, a smartphone, an enhanced general packet radio service (EGPRS) mobile phone, or an appropriate combination of any two or more of these example data processing devices or other data processing devices.

An ADLD 120 is an electronic device that can be placed at a drone landing location. In some examples, the ADLD 120 includes a flat surface on which a drone can land (e.g., a drone landing pad). The ADLD 120 includes an electronic communication interface (e.g., a network or cellular communication interface) for communicating with the computing system 102 through network 112. For example, the ADLD 120 can include a WiFi network interface, an LTE network interface, or both. In addition, the ADLD 120 includes a sensor package to guide drone landing approaches along an approach corridor to the ADLD's 120 landing pad. The sensor package can include, for example, an imaging sensor (e.g., a camera, radar, sonar), infrared sensors (e.g., light sources and detectors), orientation sensors, location sensors (e.g., GPS, WPS), visual indicators (e.g., LEDs), and audible indicators. An ADLD 120, as described in more detail below, can define drone approach corridors and guide drone approaches to landing sites.

In some implementations, and as discussed in further detail herein, the computing systems 102 host a drone control platform. The drone control platform receives drone tasks and generates a flight plan for a drone 104, 106 to accomplish the tasks. Drone tasks can include, but are not limited to, aerial surveying, videography, search and rescue, scientific research, crop dusting, livestock management, object pick-up, and object delivery. For example, the drone control platform can receive task data from a computing device 108, 110 and use the task data to generate a flight plan for a drone 104, 106. In some examples, the drone control platform can select a drone to execute the task based on the task data. For example, the drone control platform can select a particular type of drone that is most suited to the task based on performance metrics associated with the type of drone, or sensor packages 114 that the drone 104, 106 includes or that can be attached to the drone 104, 106, and/or availability of the drone 104, 106. In some examples, the drone control platform can select a sensor package 114 for the drone 104, 106. In some examples, the sensor package 114 is already provided for the drone 104, 106 and is taken into account when determining the flight plan. In some examples, the drone control platform can adapt the flight plan to a pre-selected drone (e.g., a user 116, 118 may request a flight plan for the user's specific drone 104, 106).

In some implementations, the drone control platform uses the flight task data, mechanical features, and/or the drone sensor package to generate a flight plan for a drone 104, 106. In some examples, the flight plan can include, for example, a type of drone to perform the flight, a sensor package for the drone (e.g., a sensor package to be installed on the drone to perform the flight tasks), a plurality of waypoints, and flight profiles between waypoints. In some examples, the flight profiles can include, for example, expected flight time between waypoints, drone speed between waypoints, drone altitude, expected drone flight attitude (e.g., an orientation angle of the drone with respect to the horizon), expected battery state (e.g., charge level), and sensor configurations/operations.

In some implementations, the drone control platform generates a flight plan that is agnostic to the various types of flight controllers available for drones 104, 106. In other words, the flight plan is not formatted for execution by any particular flight controller, but can be adapted for use with any one of a variety of different drone flight controllers. In some implementations, the drone control platform can include adapters that enable the drone control platform to communicate a flight controller agnostic flight plan to different types of drone flight controllers. For example, the adapters can convert the flight controller agnostic flight plan into a flight controller specific format, such that the flight plan can be executed by a particular flight controller.

In some implementations, the adapters can be software modules that are stored and executed by computing systems 102. In some examples, the adapters can be a software module stored on and executed by a computing device (e.g., computing device 108). For example, the computing systems 102 can send a flight controller agnostic flight plan to computing device 108. The computing device 108 can use an adapter to convert the flight controller agnostic flight plan into a flight controller specific format and send the flight controller specific flight plan (or drone control commands based on the flight plan) to the drone's (e.g., drone 104) flight controller. In some examples, the adapters can be stored on an executed by a special purpose computing device (e.g., an adapter module of a drone communication interface, a raspberry Pi device configured as a flight controller adapter) that is coupled to the drone or in communication with the drone. For example, the flight controller agnostic flight plan can be sent to the special purpose computing device. The special purpose computing device can convert the flight controller agnostic flight plan into a flight controller specific format and provide the flight controller specific flight plan (or drone control commands based on the flight plan) to a drone's 104, 106 flight controller.

In some implementations, the drone control platform can provide the flight plan to the drone 104, 106 for execution by the drone 104, 106. For example, the drone control platform can provide the flight plan directly to a drone (e.g., drones 106) through the network 112. In some implementations, the drone control platform can provide the flight plan to a drone (e.g., drone 104) through a user's 116 computing device 108. For example, the drone control platform can send the flight plan to the user's 116 computing device 108, and the user 116 can upload the flight plan to their drone 104 from the computing device 108.

The drone control platform can receive flight data from the drone 104, 106 while the drone executes the flight plan. The flight data can include, for example, battery status, speed, altitude, location data (e.g., GPS data), and sensor data (e.g., data obtained by the drones sensor package such as camera images). In some implementations, the drone control platform can analyze the flight data in real-time (e.g., the flight data can be analyzed while the drone is in-flight executing the flight plan). The drone control platform can use the flight data to generate flight plan modifications and send the modifications to the drone 104, 106 in real-time. In some examples, the drone control platform can determine one or more flight characteristics of the drone from the flight data. For example, to minimize the bandwidth of communications between the platform and the drone, the flight data can be minimized (e.g., only GPS data may be received). The drone control platform can calculate additional drone flight characteristics from the flight data (e.g., GPS data), such as speed, altitude, position, heading, etc.

In some examples, the drone control platform can enable a user 116, 118 to monitor a drone's 104, 106 execution of a flight plan. For example, the drone control platform can format at least a portion of the flight data, including sensor data (e.g., camera images), for display on a computing device 108, 110, and provide the formatted flight data to a user's 116, 118 computing device 108, 110. In some implementations, the drone control platform can allow a user who requested the flight plan (e.g., submitted flight task data) to monitor the drone's 104 execution of the flight plan (e.g., user 116 can monitor the flight of drone 104). In some examples, the drone control platform can allow a remote user 118 (e.g. a friend or colleague of user 116) to monitor the drone's 104 execution of the flight plan (e.g., user 116 can monitor the flight of drone 104).

In some implementations, the platform obtains environmental data (e.g., geographic data, weather data, historical flight data) associated with the drone flight location, drone performance metrics, and/or sensor performance metrics. In some examples, the computing systems 102 can interface with one or more third-party systems 122 (e.g., a weather system, a Federal Aviation Administration (FAA) system, a database of topographical maps, etc.). The third-party systems 122 can be computing systems, for example, web servers, or database systems. The drone control platform can access information from the third-party systems 122 (e.g., weather information, air traffic information, or land topology information). The drone control platform can use the accessed information to generate flight plans or flight plan modifications. In some implementations, the drone control platform can receive ADLD status information from a network of ADLDs that are registered with the platform. For example, the ADLD status information can include data that indicates the availability of each ADLD in the network to guide drone approaches associated drone landing sites.

In some examples, the drone control platform can use the environmental data, ADLD status information, drone performance metrics, and/or sensor performance metrics in combination with the flight task data to generate a drone flight plan for a particular task. For example, the drone control platform can select an appropriate drone 104, 106 and sensor package 114 for a particular task based on the task data, the drone performance metrics, and the environmental data. For example, the drone control platform can use topology information to determine flight altitudes for various portions of a flight plan. As another example, the drone control platform can use weather information to modify a flight plan (e.g., to steer a drone around approaching weather or delay/reschedule/abort a flight). As another example, the drone control platform check for airspace restrictions (e.g., from an FAA system) and generate a flight plan that avoids restricted airspace. As another example, the drone control platform can use ADLD information to reschedule or reroute drones that are schedule to land at an unavailable ADLD.

In some implementations and as described in more detail below with reference to FIG. 3A, the drone control platform can use defined drone access corridors that enable drone operations (e.g., drone-based object pickup and delivery) near commonly used ground locations, such as those that are located in residential or commercial areas. In some examples, the drone control platform can control access to the drone approach corridors by one or more drones 104, 106.

In some implementations, the drone control platform can analyze the drone flight data and sensor data obtained by the drone during the flight to verify completion of the flight plan. In some examples, the drone control platform can generate a re-tasking flight plan for the same or a different drone, if the task was not completed (e.g., due to weather, drone endurance (battery drain), mechanical/computational failure). In some examples, the drone control platform can use the flight data to build a drone performance profile. For example, the drone control platform can compare the original flight plan to the actual flight data to evaluate the drone's performance and infer drone performance metrics for the particular drone and/or the type of drone used. In some examples, the drone control platform can use computer learning techniques to analyze the flight plan and flight data. In some examples, the drone control platform can incorporate external information (e.g., location specific information, weather information) to include the drone's performance under particular circumstances (e.g., in rough terrain (requiring many altitude changes) or under particular weather conditions) into drone performance profiles. In some examples, the drone control platform can use the flight data to modify attributes of drone approach corridors (e.g., boundaries, collision avoidance protocols, etc.) that a drone 104, 106 may have navigated while executing a flight plan.

Figure 2A:
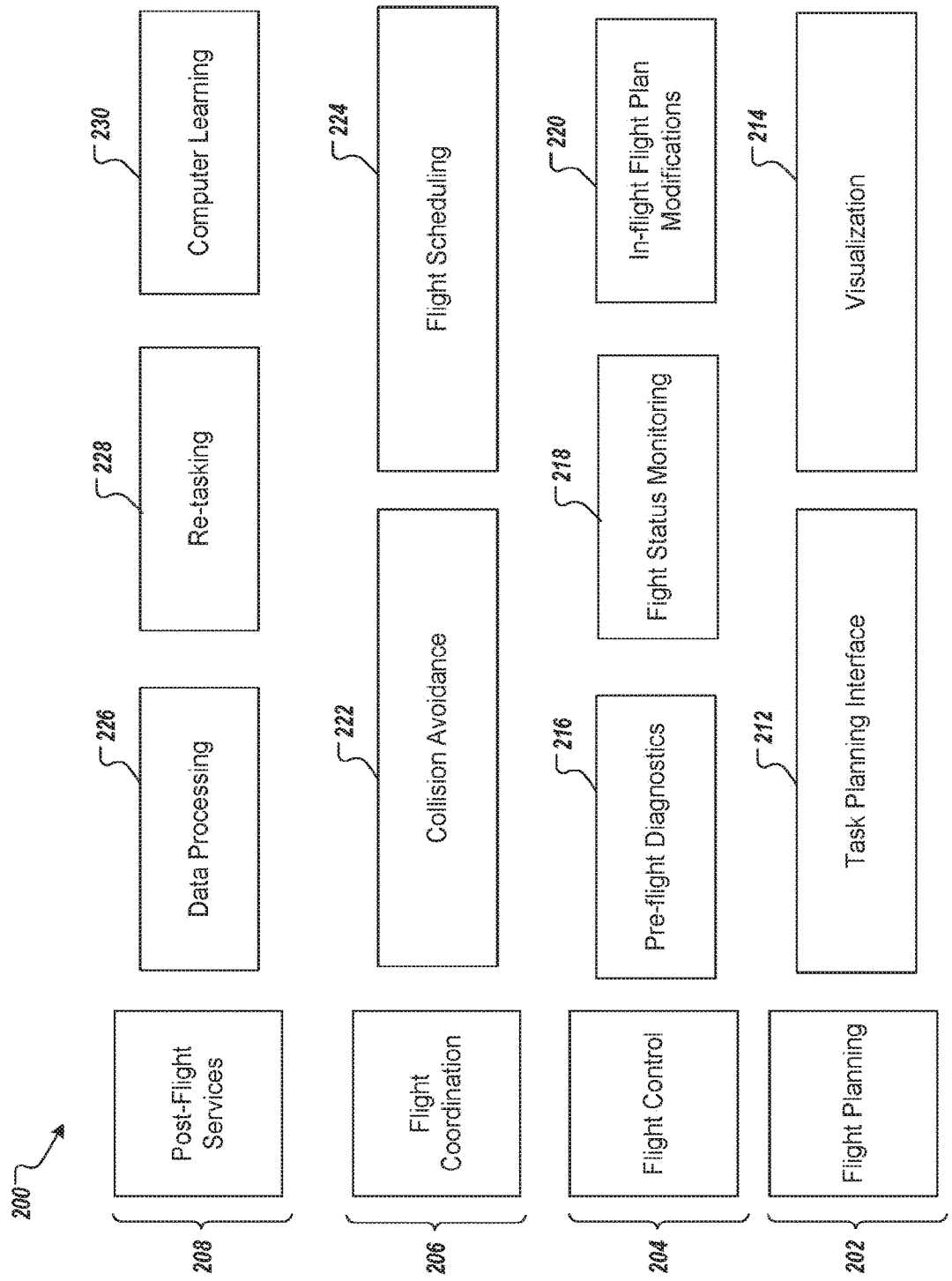
FIG. 2A depicts an example service platform in accordance with implementations of the present disclosure.

FIG. 2A depicts an example drone control platform 200 in accordance with implementations of the present disclosure. The example drone control platform 200 can provide one or more drone flight control services including, but not limited to, flight planning 202, flight control 204, flight coordination 206, and post-flight services 208. In some examples, the flight planning 212 includes a task planning interface 212 and pre-flight visualization 214 of a generated flight plan. In some examples, the task planning interface 212 is an interface with computing systems 102 through which a user submits drone tasking data. For example, drone tasking data can include, but is not limited to, a task type (e.g., surveying, videography, performing sensor measurements, livestock surveillance, object delivery/pickup, etc.) and one or more geographical locations for a drone flight (e.g., latitude and longitude). In some examples, geographical locations for a drone flight can include a takeoff position, a landing position, and, optionally, one or more waypoints. In some examples, the geographic location for a drone flight can be a geographic area (e.g., a set of geographic coordinates defining a flight area). For example, the geographic area can be an area for the drone to survey. For example, the geographic location can simply include an origin and a destination (e.g., for object pickup and delivery). In some examples, the origin and destination can be a first and a second ADLD that are each registered with the platform 200.

In some examples, task planning interface 212 includes a user interface through which a user can provide drone tasking data. In some examples, the following example functionality is provided by the user interface: task selection, location identification, waypoint identification, drone type selection, drone selection, sensor package selection, flight scheduling, and drone monitoring options. In some examples, the user interface can permit a user to select an origin and/or destination from a list of ADLDs that are registered with the platform 200.

In some examples, task planning interface 212 interfaces with one or more third-party systems (e.g., a weather system, a Federal Aviation Administration (FAA) system, a database of topographical maps, etc.). The drone control platform can access information (e.g., weather information, air traffic information, or land topology information) from the third-party systems and use the third party data to generate or modify a flight plan. For example, the drone control platform can use the environmental data, air traffic information, or land topology information in combination with the flight task data to generate a drone flight plan for a particular task. For example, the drone control platform can select an appropriate drone 104, 106 and sensor package 114 for a particular task based on the task data, the drone performance metrics, and the environmental data. For example, the drone control platform 200 can use topology information to determine flight altitudes for various portions of a flight plan or to select a drone with sufficient endurance and power to operate at widely varying altitudes in mountainous terrain. As another example, the drone control platform 200 can use weather information to modify a flight plan (e.g., to steer a drone around approaching weather or delay/reschedule a flight). As another example, the drone control platform 200 can check for airspace restrictions (e.g., from an FAA system) and generate a flight plan that avoids restricted airspace. In some examples, the drone control platform 200 can submit a flight plan to a third party (e.g., an air traffic control system), for example, for flight plan approval or for coordination with other, non-drone flights. As another example, the drone control platform 200 can schedule a recharge stop at an ADLD that has a recharging station, for example, if a drone's battery endurance is insufficient to complete a flight between a designated origin and destination on a single battery charge.

In some examples, the drone control platform 200 provides a pre-flight visualization 214 of a flight plan. For example, the drone control platform 200 can provide a graphical simulation of the flight plan, as described in more detail below in reference to FIG. 2B.

In some examples, the flight control services 204 include pre-flight diagnostics 216, flight status monitoring 218, and in-flight flight plan modifications 220. In some examples, pre-flight diagnostics 216 can include analyzing the flight plan based on pre-flight diagnostic data received from the drone, environmental data, airspace data, ADLD information, and drone scheduling data. For example, pre-flight diagnostic data can include the location of the drone, battery status, and other appropriate data. Environmental data can include, for example, current weather conditions. Airspace data can include, for example, information related to other aircraft and drones that may interfere with the drone's flight plan. Drone scheduling data can include, for example, flight plans or in-flight data from other drones controlled by the drone control platform 200. The drone control platform 200 can review the flight plan and make appropriate modifications to the flight plan based on any or all of the pre-flight diagnostic data, environmental data, airspace data, or drone scheduling data.

For example, if the drone's battery charge is less than required for the complete flight plan, the platform can modify the flight plan accordingly. As another example, if the drone is located at a position other than the takeoff point of the flight plan the platform can modify the flight plan accordingly. For example, if another aircraft or drone is located in the area, the platform can delay or modify the flight plan. As another example, a different drone may be scheduled to use or delayed in its use of a particular drone approach corridor which the drone undergoing pre-flight diagnostics is scheduled to use, or an associated ADLD may indicate that the drone approach corridor is unavailable. Upon detecting such a situation, the platform 200 can modify the flight plan for the drone undergoing pre-flight diagnostics accordingly.

In some examples, flight status monitoring 218 can include providing drone flight data to a user's computing device, as described above. The flight status can include, for example, a graphical representation of the drone's location (e.g., overlaid on a digital map), drone speed, drone altitude, battery status, task status, and sensor data. In some examples the flight status monitoring 218 can provide additional in-flight functionalities such as, but not limited to, manual control override, manual flight plan modification, and re-tasking or additional tasking options.

In some examples, in-flight flight plan modifications 220 can include controlling the drone's flight by sending modifications to the drone's flight plan. The modifications can be automatically generated by the drone control platform 200. For example, as discussed above, drone control platform 200 can make flight plan modifications based on drone flight data, other drone control platform 200 data (e.g., flight plans for other drones), and information from third-party systems (e.g., weather data, airspace data). The flight data can include, for example, battery status, speed, altitude, location data (e.g., GPS data), and sensor data (e.g., data obtained by the drones sensor package such as camera images). The drone control platform 200 can modify the flight plan based on the drone flight data and send flight plan updates to the drone while the drone is in-flight.

For example, if the wind is stronger than expected and such that the attitude of the drone is steeper than expected, the field of view (FOV) of a drone's camera may be altered from that expected in the flight plan. The drone control platform 200 can calculate compensating waypoints to ensure that proper camera images (e.g., images in accordance with the drone's task) are obtained and send the updated flight plan to the drone. In some examples, a compensating waypoint can include a waypoint that is added to or modified within a flight plane to compensate based on in-flight feedback. Using the example above, if the wind is stronger than expected, and is such that the attitude of the drone is steeper than expected, the drone's camera might not be capturing an image of the complete geographical area expected to be captured. Consequently, a new waypoint can be added or an existing waypoint can be modified to provide a compensating waypoint that enables the drone's camera to be in a position to capture the image of the complete geographical area as expected.

In some examples, flight plan modifications can include defining a holding pattern for a drone to fly while awaiting permission to enter a drone approach corridor. In some examples, flight plan modifications can include re-routing a drone to another drone approach corridor (e.g., a secondary drone approach corridor) in the event that the designated drone approach corridor is occupied by another drone or is otherwise inaccessible (e.g., as indicated by an ADLD).

In some implementations, the drone control platform 200 can obtain "real-time" environment data during the drone flight, for example, weather data, airspace data, and drone approach corridor data. Airspace data can include, for example, the locations of aircraft flying in the area, or other drones flying in the area including other drones that are being concurrently controlled by the drone control platform 200. Drone approach corridor data can include, for example, information related to obstructions or the safety of drone approach corridors. For example, if the drone enters a drone approach corridor but detects (e.g., by a sensor on the drone) that the corridor is obstructed or that environmental conditions (e.g., wind speed) exceed collision avoidance protocols for the corridor, the drone can send appropriate notifications about the status of the corridor to the drone control platform. In some examples, the platform 200 can send drone approach corridor data to an ADLD associated with the approach corridor or to a user responsible for the ADLD. The drone control platform 200 can modify flight plans based on the environment data, the airspace data, or the drone approach corridor data.

In some examples, the flight coordination 206 services include collision avoidance 222 and flight scheduling 224. In some examples, collision avoidance 222 can include, but is not limited to, monitoring multiple drones concurrently executing flight paths in a similar location, coordinating access to drone approach corridors, monitoring ADLD status, monitoring air traffic control systems, coordinating drone flight plans with nearby airports, and obtaining approval for drone flight plans from regulatory agencies or airports (if necessary). In some examples, collision avoidance includes monitoring Automatic Dependent Surveillance-Broadcast (ADS-B) data to detect aircraft that may interfere with a drone's flight plan. For example, a network of ADS-B devices can be monitored to detect an aircraft (e.g., a medical rescue helicopter) taking off and determine whether the drone's flight plan will interfere with the aircraft's flight path (e.g., flight vector). If so, the drone control platform can modify the drone's flight plan (e.g., change a waypoint) or otherwise redirect the drone (e.g., direct the drone to holding pattern or temporary landing site).

In some examples, flight scheduling 224 can include, but is not limited to, coordinating drone flights to complete a task, coordinating between drones within a particular area, coordinating drone flights to complete a series of tasks, and scheduling the use of particular drone approach corridors. For example, multiple drones or multiple flights of a particular drone may be required to complete a particular task (e.g., a video documentary). The drone control platform 200 can coordinate among multiple flight plans to complete the task. As another example, multiple drones may take off and land from a particular location (e.g., a business that provides drone services). The drone control platform 200 can schedule drone tasking to coordinate landings and takeoffs by multiple drones at the same location. The drone control platform 200 can schedule drone tasking to coordinate access to appropriate drone approach corridor(s) at the location. In some examples, the drone control platform 200 can coordinate drone take-offs and landings among a network of ADLDs.

In some examples, flight scheduling 224 can include pairing a drone service requester (e.g., a user requesting drone services) with a drone provider (e.g., a user or business that operates drones to perform drone-based services). For example, the drone control platform can assign drone tasks and schedule flight plans with registered drone service providers. In some examples, the drone control platform can assign flight plans to drone service providers based on the task and performance metrics associated with the service provider's drones. In some examples, the drone control platform can assign flight plans to drone service providers based on the task and sensor packages associated with the service provider's drones.

In some examples, the post-flight services 208 include data processing 226, re-tasking 228, and computer learning 230. In some examples, data processing 226 includes functionality such as, but not limited to, processing sensor data (e.g., combining camera images to form a comprehensive survey image), generating post-flight deliverables (e.g., data reports, aerial surveys), storing sensor data (e.g., in a user account), storing flight data, and identifying maintenance or repairs needed by a drone based on flight data (e.g., battery replacement, sensor repairs).

In some examples, re-tasking 228 can include analyzing flight data and sensor data to determine a completion status of the flight plan and/or drone task(s). For example, the drone control platform 200 can determine whether all the tasks required by the flight plan were completed. The drone control platform 200 can generate a new flight plan to finish an uncompleted portion of the original flight plan. In some examples, the drone control platform 200 can determine how well the tasks were completed. For example, some survey images may be poor quality due to a wind gust. Furthermore, the drone control platform 200 may not have been able to modify the flight plan to have the drone re-take the poor quality images during the flight due to the drone's battery state. The drone control platform 200 can generate a new flight plan to re-perform a portion of the original flight plan to obtain better quality data (e.g., images).

In some examples, computer learning 230 includes analyzing flight data and/or sensor data using computer learning algorithms. For example, the drone control platform 200 can use drone flight data to build performance profiles of drones (e.g., drone performance metrics). For example, the original flight plan can be compared with the flight data to evaluate the drone's performance and infer drone performance metrics about the particular drone and/or the type of drone used. In some examples, sensor data can be used to develop location profiles for use in generating future flight plans. Moreover, location profiles can include, for example, indications of ground topography and flight obstructions (e.g., power wires, trees, buildings, etc.). In some examples, location profiles can include, for example, indications of ground topography and flight obstructions (e.g., power wires, trees, buildings, etc.) in and around drone approach corridors. In some examples, the drone control platform 200 can use both flight data and data received from an ADLD (e.g., ADLD sensor data) related to a drone approach corridor to develop a location profile for the approach corridor. In some examples, location profiles of drone approach corridors can be shared with respective ADLDs associated with the approach corridors. For example, an ADLD can use the location profile data to recalibrate sensors.

Figure 2B:
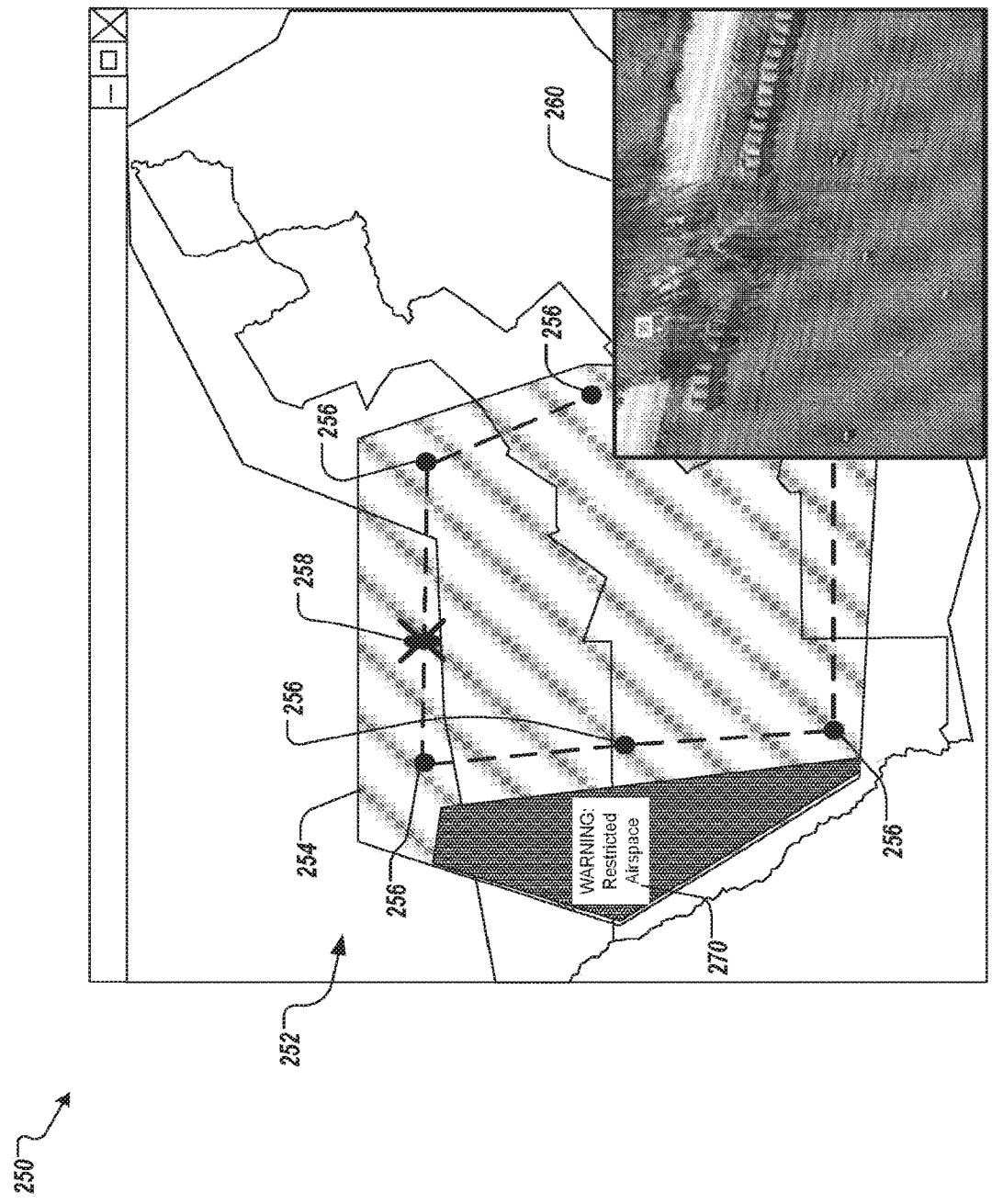
FIG. 2B depicts an exemplary graphical user interface (GUI) in accordance with implementations of the present disclosure.

FIG. 2B is an example graphical user interface (GUI) 250 in accordance with implementations of the present disclosure. One or more features of the example GUI 250 described below can be incorporated into user interfaces for a task planning interface 212 or a flight status monitoring interface (e.g., as part of task planning interface 212 or flight status monitoring 218 services described above). The GUI 250 includes a map interface 252, a polygon selection tool 254, flight plan waypoints 256, a drone icon 258, and a flight visualization window 260.

In some implementations, a user can submit drone task data through the map interface 252. For example, the map interface 252 can allow a user to select a location for a drone task (e.g., a land survey, livestock monitoring, videography, or research and data collection). In some examples, the user can define a drone task (e.g., an area of land to be surveyed) using a polygon selection tool 254. For example, the drone control platform can generate a flight plan based on the selected area.

In some examples, a drone flight (e.g., waypoints 256) can be displayed on the map interface 252. In some examples, the drone control platform can provide the user with a preview of the flight plan. For example, the GUI 250 can demonstrate the flight plan to the user by moving a drone icon 258 along the flight plan. In some examples, flight plan information (e.g., expected battery status, speed, altitude, sensor operations) can be displayed to a user as the icon 258 moves along the flight plan. In some examples, the flight plan preview can provide the user with simulated data collections (e.g., in the flight visualization window 260). For example, the drone control platform can simulate the drone flight along the flight path based on satellite imagery.

In some examples, a warning 270 can be displayed if a flight task cannot be accomplished. For example, as depicted in FIG. 2B a portion of the flight area selected using the polygon selection tool is within restricted airspace. Therefore, in the depicted example, the drone control platform provides a warning to notify the user that the flight plan will not include the restricted airspace and will direct the drone to avoid the restricted airspace.

Figure 3A:
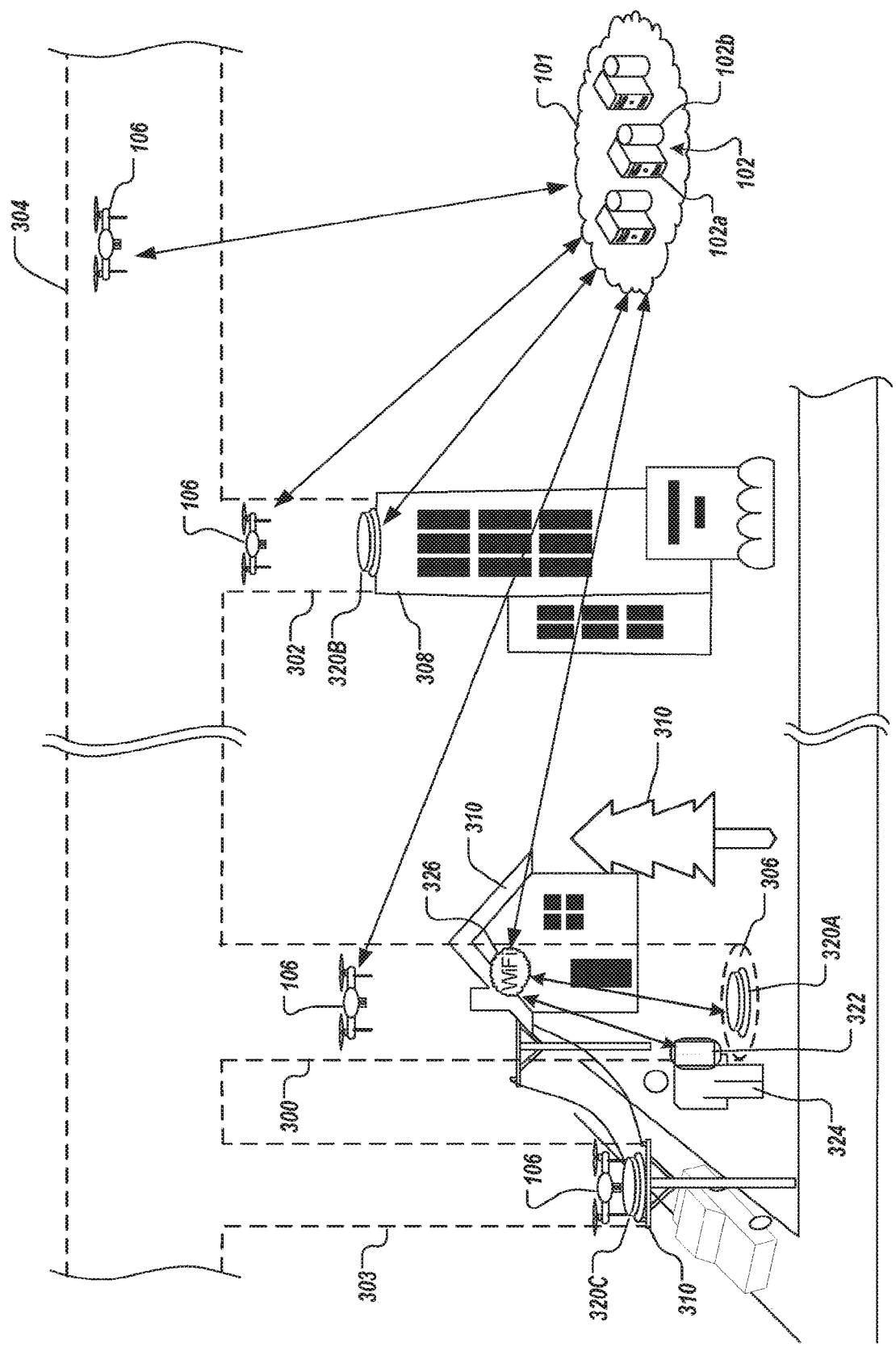
FIG. 3A depicts example drone approach corridors in accordance with implementations of the present disclosure.

FIG. 3A depicts example drone approach corridors 300, 302, 303, 303 in accordance with implementations of the present disclosure. The drone approach corridors 300, 302, 303, 303 are provided as volumes of airspace extending from an area 304 above a target location (e.g., a ground-level location 306 or a rooftop location 308) to the target location 306, 308. In some examples, the area above the target locations 306, 308 may be a flight corridor (e.g., a drone highway). In some examples, drone approach corridors 300, 302, 303, 303 may enable safe drone operations (e.g., drone-based object pickup and delivery) near commonly used target locations 306, 308, such as target locations 306, 308 located in residential or commercial areas. For example, drone approach corridors 300, 302, 303 may provide drones 106 with flight paths and protocols for safely navigating the drone approach corridor 300, 302, 303 and avoiding obstructions 310 in and around target locations 306, 308.

In some implementations, drone approach corridors 300, 302, 303 can be associated with an ADLD 320A, 320B, 320C. As noted above and discussed in more detail below, an ADLD 320A, 320B, 320C can guide a drone's 106 approach to a landing site within an associated drone approach corridor (e.g., one of 300, 302, 303). For example, ADLD 320A is associated with drone approach corridor 300. ADLD 320A is an example of a private user's ADLD. For example, ADLD 320A is used by a private user to configure a landing site (e.g., target location 306) and drone approach corridor 300 for drone based object pick-up and delivery at the user's home. ADLD 320B is associated with drone approach corridor 302. ADLD 320B is an example of a business user's ADLD. For example, ADLD 320B may represent multiple ADLD's and may be used by a business to configure one or more landing sites (e.g., target location 308) and drone approach corridors 302 for drone based object pick-up and delivery at a business location (e.g., an office building, shopping center, industrial park, warehouse site, individual businesses, etc.). ADLD 320C is associated with drone approach corridor 303. ADLD 320C is an example of a drone charging ADLD. For example, ADLDs 320C may be used by a drone service business to configure landing sites and drone approach corridors 303 for drone's 106 to recharge. The ADLD's 320A, 320B, 320C can communicate with the computing systems 102 through a network communication interface (e.g., an LTE or WiFi interface). For example, ADLD's 320B and 320C may communicate with the computing systems 102 through an LTE interface, while ADLD 320A may communicate with the computing systems 102 through the user's 324 WiFi network 326.

For example, the drone approach corridors 300, 302, 303 can be defined based on a plurality of attributes that regulate drone operations within the associated airspace. The drone approach corridors 300, 302, 303 can include attributes that define, for example, the location of the drone approach corridor 300, 302, 303 (e.g., geographical coordinates of an entry point for a drone approach corridor 300, 302, 303 and the target location 306, 308 associated with the drone approach corridor 300, 302, 303), boundaries of the drone approach corridor 300, 302, 303, procedures for drones to request access to the drone approach corridor 300, 302, 303, and collision avoidance protocols for drone operations within the drone approach corridor 300, 302, 303. In some examples, collision avoidance protocols can be defined for drones to detect and avoid ground obstructions 310 within or near a drone approach corridor (e.g., power lines, tree branches, animals, or people). Collision avoidance protocols can include, for example, drone size limitations for a particular drone approach corridor 300, 302, 303, drone performance limitations for a particular drone approach corridor 300, 302, 303, environmental limitations (e.g., wind speed) for entering a drone approach corridor 300, 302, 303, standoff distances 312 from obstructions 310 inside or near the drone approach corridor 300, 302, 303, speed limits (e.g., descent/ascent rate limits) within the drone approach corridor 300, 302, 303, one or more secondary drone approach corridors 300, 302, 303, and battery state restrictions within the drone approach corridor 300, 302, 303 (e.g., required minimum charge level to takeoff or enter the drone approach corridor 300, 302, 303). In some examples, data defining the drone approach corridors 300, 302, 303 can be stored by a drone control platform, such as a drone control platform hosted by computing cloud 101. For example, the data defining a plurality of drone approach corridors 300, 302, 303 can be stored by computing systems 102 of the computing cloud 101.

In some implementations, an ADLD 320A, 320B, 320C defines or aids in defining an associated drone approach corridor 300, 302, 303, and registers the corridor with the drone control platform. For example, with reference to ADLD 320A, the ADLD 320A can establish a drone approach corridor during a configuration phase. For example, after a user 324 places an ADLD 320A at a desired drone landing location 306 (e.g., in the user's yard) and powers on the ADLD 320A, the ADLD 320A can initiate a configuration process. During the configuration process, the ADLD 320A can perform several diagnostic checks to, for example, verify the airspace above the ADLD 320A is free of obstructions 310 (e.g., absence of tree branches, powerlines, etc.), establish a drone approach corridor 300, verify that the drone landing pad associated with the ADLD 320A is sufficiently level for a drone 106 to land, and/or determine the geographic location of the ADLD 320A (e.g., latitude, longitude, and altitude—if located on a structure above the ground). For example, the ADLD 320A can obtain an image of the airspace above the ADLD 320A (e.g., using an imaging sensor). The ADLD can analyze the image to verify that there are no obstructions 310 (e.g., power lines, tree branches) in the airspace between the ADLD 320A and the area 304 above the ADLD 320A (e.g., a drone highway). In some examples, the ADLD can use radar or sonar (e.g., transceivers or transducers) to generate images and detect obstructions in the airspace above the ADLD 320A. In addition, the ADLD 320A can monitor the airspace in a similar manner to detect new obstructions after the configuration phase.

For example, the ADLD 320A can obtain multiple images using different fields of view (FOV) to search for obstructions at different ranges (e.g., altitudes above the ADLD 320A. Each FOV in a scale of FOVs corresponds to a particular area of airspace at a given range. For example, a first FOV, to search for obstructions 310 near ground level, may be approximately 90° and m may correspond to area of airspace with a diameter of approximately 10 ft at a range of approximately 10 ft above the ADLD 320A. Similarly, a second FOV to search for obstructions at a medium distance above the ADLD 320A may be approximately 22.5° and may correspond to area of airspace with a diameter of approximately 10 ft at a range of approximately 50 ft above the ADLD 320A. And, a third FOV to search for obstructions at a further distance above the ADLD 320A may be approximately 11.5° and may correspond to area of airspace with a diameter of approximately 10 ft at a range of approximately 100 ft above the ADLD 320A. Furthermore, images may be analyzed using object detection algorithm either by the ADLD 320A or sent to the drone control platform to be analyzed. In addition, the pixel sizes in each image can be mapped to appropriate distances within each image, based on the FOV of the image, for example, to determine a size of an obstruction 310 and or a distance of an obstruction from a desired drone approach corridor 300 boundary.

If there are no obstructions, the ADLD 320A can define the volume of airspace as a new drone approach corridor. In some examples, the drone control platform can define the new drone approach corridor based on data received from the ADLD 320A. If there are obstructions within the volume of airspace, the ADLD 320A can notify the user 324 of the obstructions. In some examples, the ADLD 320A can provide the user 324 with an image (or other means of feedback) of the airspace including an annotation identifying any obstruction 310. For example, the ADLD 320A can send the notification and image to the user's computing device 322 or, in some examples, display the image on a display of the ADLD 320A.

In some examples, the ADLD 320A can verify the orientation of a landing pad to determine whether the landing pad is sufficiently level for a drone 106 to land. For example, the ADLD 320A can determine based on orientation sensor data whether the ADLD is sufficiently level for a drone to land on the landing pad. If not, the ADLD 320A can send a notification to the user's 324 computing device 322 instructing the user 324 to level the ADLD 320A.

In some implementations, the ADLD 320A can register with the drone control platform, for instance, to confirm that the ADLD 320A is ready to receive drones. For example, after the ADLD 320A completes the configuration phase, the ADLD 320A can send registration information to the drone control platform. Registration information can include, but is not limited to, a unique identifier assigned to the ADLD 320A (e.g., a serial number), location of the ADLD 320A, user 324 information (e.g., a login identity and password for the platform or a drone delivery system, and user contact information), secondary ADLDs or drone approach corridors associated with the ADLD 320A (e.g., a backup ADLD or approach corridor), and data defining the drone approach corridor 300 associated with the ADLD 320A (e.g., location and boundaries of the corridor) or ADLD sensor data that the drone control platform can use to define an approach corridor 300 associated with the ADLD 320A. The drone control platform can use the ADLD 320A registration data to coordinate, with the ADLD 320A, for drone approaches and landings at the ADLD's landing pad.

In some examples, the ADLD 320A can communicate with the user's 324 computing device 322 through an application on the computing device 322. For example, the application can guide a user 324 to configure an ADLD 320A and, as discussed more below, alert the user 324 of arriving/scheduled drone deliveries and problems or maintenance associated with the ADLD 320A or drone approach corridor 300 (e.g., a need to remove obstructions 310 or reposition the ADLD 320A).

In some examples, a drone control platform can control access to drone approach corridors 300, 302, 303 by multiple drones 106. In some examples, the drone control platform can coordinate drone 106 access to hundreds, thousands, or even millions of drone approach corridors 300, 302, 303 across one or more geographic areas. More specifically, a drone control platform can be used to coordinate the ascent/descent of multiple drones 106 within the same drone approach corridor 300, 302, 303. In some examples, the drone control platform can use an entry request protocol to coordinate drone entry into and ascents/descents within a drone approach corridor. For example, a drone 106 may not be permitted to enter a drone approach corridor 300, 302, 303 until the drone requests an approach (e.g., ascent, descent) in the particular drone approach corridor 300, 302, 303, and the request is granted by the platform. For example, if a first drone 106 has received permission to perform an approach in a particular drone approach corridor 300, 302, 303, and a second drone 106 requests to enter the same drone approach corridor 300, 302, 303, the drone control platform will deny the second drone's 106 request to enter the drone approach corridor. As another example, if an ADLD 320A, 320B, 320C, associated with a particular drone approach corridor 300, 302, 303 indicates that the corridor is unavailable (e.g., obstructed), the drone control platform will deny the second drone's 106 request to enter the drone approach corridor.

In some examples, if the second drone's 106 request is denied, the drone control platform can define a holding pattern for the second drone 106, or re-route the second drone 106 to and grant the second drone 106 access to enter a secondary drone approach corridor. In some examples, a holding pattern can be located outside a drone highway. In some examples, a drone approach corridor 300, 302, 303 can be associated with one or more secondary drone approach corridors (and associated ADLDs). A secondary drone approach corridor can be, for example, a flightpath along a different route to the same target location as the primary drone approach corridor, or another drone approach corridor that leads to the same target location or a different target location within the same geographic vicinity as the primary drone approach corridor. For example, the secondary drone approach corridor can be a drone approach corridor that leads to a target location that is nearest, geographically, to the target location of the primary drone approach corridor (e.g., a neighbor's ADLD). In another example, the secondary drone approach corridor can be a drone approach corridor that leads to a target location that is in some way associated with the target location of the primary drone approach corridor (e.g., the target locations of both the primary and secondary corridors may be on the same property).

In some examples, when a drone 106 is granted permission to enter a drone approach corridor (e.g., drone approach corridor 300), the drone control platform can send a notification to the associated ADLD (e.g., ADLD 320A) that indicates that the drone 106 has or will be entering the corridor 300. The ADLD 320A can guide the drone to land on a landing pad at the target location 306. For example, a drone 106 can request to enter a drone approach corridor 300 associated with the ADLD 320A. In some examples, the drone 106 can send a request to enter the drone approach corridor to the drone control platform. The drone control platform can monitor the status of the ADLD 320A (e.g., whether the ADLD 320A is online, obstructed, or currently has another drone landing), and either grant or deny the request based on the ADLD's 320A status. If the request is granted, either the drone control platform or the drone 106 itself can indicate to the ADLD 320A when the drone enters the drone approach corridor.

The ADLD 320A can guide the drone 106 along the approach corridor 300 to the landing pad once the drone's 106 request is granted and the ADLD 320A receives an indication that the drone 106 has entered the approach corridor 300. For example, the ADLD 320A can identify the drone's 106 position within the corridor using an imaging sensor (e.g., camera, radar, or sonar), and issue appropriate course corrections to the drone 106 to guide the drone 106 along the corridor 300. For example, the ADLD 320A can determine from images of the drone's horizontal position within the corridor that the drone 106 is approaching a boundary of the corridor 300, and issue appropriate course corrections to the drone 106 to re-center the drone 106 in the corridor 300. For example, the ADLD 320A can determine a drone's 106 distance above the ADLD 320A based on a radar range obtained by a sensor on the ADLD 320A or from altitude data communicated to the ADLD 320A from the drone 106. The ADLD 320A can determine the drone's 106 proximity to corridor 300 boundaries based on the FOV of the images, pixels sizes, and the drone's 106 distance from the ADLD 320A. In some examples, the ADLD 320A can use other position finding techniques to locate the drone within the approach corridor and guide it to the landing pad (e.g., RF triangulation techniques, such as WiFi positioning).

The ADLD 320A can issue course corrections to guide the drone's approach to the landing pad based on the position of the drone within the approach corridor 300. For example, the ADLD 320A can send course corrections either through direct communication with the drone 106 (e.g., WiFi, RF, IR, Bluetooth) or through the drone control platform. In some examples, the ADLD 320A can have an IR camera, for example, to detect IR light sources on the drone 106. The ADLD 320A can detect the position of the drone 106 based on the location of the drone's IR light sources in an image of the approach corridor 300, and issue course corrections as appropriate.

In some implementations, the second data can be communicated to the drone by varying lighting configurations on the ADLD or on the landing pad of the ADLD. For example, illuminating lights (e.g., visible or IR lights) on one side of the landing pad can instruct the drone to alter its course towards or away from that side of the landing pad. Various light flashing patterns, flashing frequencies, or light wavelengths (e.g., colors) can be used to instruct the drone how much to alter course or to alter a rate of descent/ascent.

In some implementations, the ADLD 320A can illuminate landing guidance lights (e.g., IR lights at the perimeter of the landing pad) to guide the drone 106 to the landing pad. For example, the drone 106 can include infrared sensors (e.g., an IR camera). The drone 106 can use the landing guidance lights to determine its own position within the approach corridor 300. In some examples, a drone can use the ADLD's 320A landing guidance lights in conjunction with the course corrections from the ADLD 320A to land on the landing pad.

In some implementations, the ADLD 320A can provide status updates to the drone control platform. For example, the ADLD 320A can detect if the landing pad or drone approach corridor 300 becomes obstructed, and inform the drone control platform. In such situations, the drone control platform can deny all drone requests to land at the ADLD 320A until the obstruction is cleared. In addition, the ADLD 320A or the drone control platform can notify the user 324 that the ADLD 320A is obstructed so that the user 324 can remove the obstruction or reposition the ADLD 320A and landing pad.

In some implementations, the ADLD 320A includes visual and/or audible indicators to alert bystanders (e.g., user 324) that a drone 106 is entering the drone approach corridor and will be landing at the landing site. Visual indicators can include, for example, lights (e.g., flashing LEDs or strobe lights), and audible indicators can include, for example, a siren, alarm, or verbal messages. For example, when the ADLD 320A receives an indication that a drone is entering the drone approach corridor 300, the ADLD 320A can initiate the visual or audible indicators to alert any bystanders of the approaching drone 106. In some implementations, the ADLD 320A includes a proximity sensor to detect when an object (e.g., a person, animal) is within a threshold distance (e.g., a safety distance) of the ADLD 320A during a drone 106 ascent or descent. For example, if the ADLD 320A detects an object within a safety area, the ADLD can instruct a descending drone 106 to stop its approach to the landing pad. For example, the ADLD 320A can instruct the drone 106 to abort its descent, exit the drone approach corridor, hover until the object (e.g., person) leaves the safety area, or re-route the drone 106 to a secondary ADLD.

In some implementations, ADLD 320A communications with drones are agnostic to drone flight controllers. For example, the ADLD 320A can include adapters that enables it to communicate course corrections to any drone flight controller in a format that can be executed by the flight controllers.

In some implementations, the drone control platform coordinates the use of drone approach corridors in advance of a drone 106 requesting an approach using a particular drone approach corridor 300, 302, 303. For example, the drone control platform can schedule multiple drone 106 approaches for a drone approach corridor 300, 302, 303 in advance of each drone 106 actually requesting entry into the drone approach corridor 300, 302, 303. For example, the platform can coordinate drone flight plans such that each of multiple drones 106 arrive at a particular drone approach corridor at different times. For example, drone arrival times at a drone approach corridor 300, 302, 303 can be sufficiently spaced, such that each drone 106 has sufficient time to descend, perform one or more tasks (e.g., pickup or deliver objects), and ascend prior to a second drone 106 reaching the approach corridor 300, 302, 303. In some examples, the drone control platform can coordinate drone arrival times at a drone approach corridor 300, 302, 303 by modifying characteristics of each drone's 106 flight plan (e.g., takeoff times, airspeed, waypoints, charge locations, intervening tasks, etc.).

Although the drone approach corridors 300, 302, 303 depicted in FIG. 3A are illustrated as vertical columns of airspace extending from an area 304 above a target location to the target location 306, 308, it should be appreciated that drone approach corridors 300, 302, 303 can be defined to occupy paths of airspace having varying shapes or geometries from an area 304 above a target location (e.g., a drone highway) to the target location 306, 308. For example, a drone approach corridor 300, 302, 303 can be defined as a bounded paths of airspace that includes multiple portions at varying angles to guide a drone to and from a target location. Furthermore, an entry point for a drone approach corridor 300, 302, 303 need not be directly above the associated target location. In some examples, drone approach corridors 300, 302, 303 can include branches where each branch leads to different target locations.

In some implementations, some ADLDs (e.g., ADLD 320C) can be designated for a particular purpose. For example, ADLD 320C is depicted as a drone charging ADLD. For example, the ADLD 320C may be located on top of or near a convenient power source (e.g., power lines). In some examples, a business that runs the drone control platform may distribute and maintain a network of designated drone charging ADLDs 320C to service drones 106 controlled by the platform.

Figure 3B:
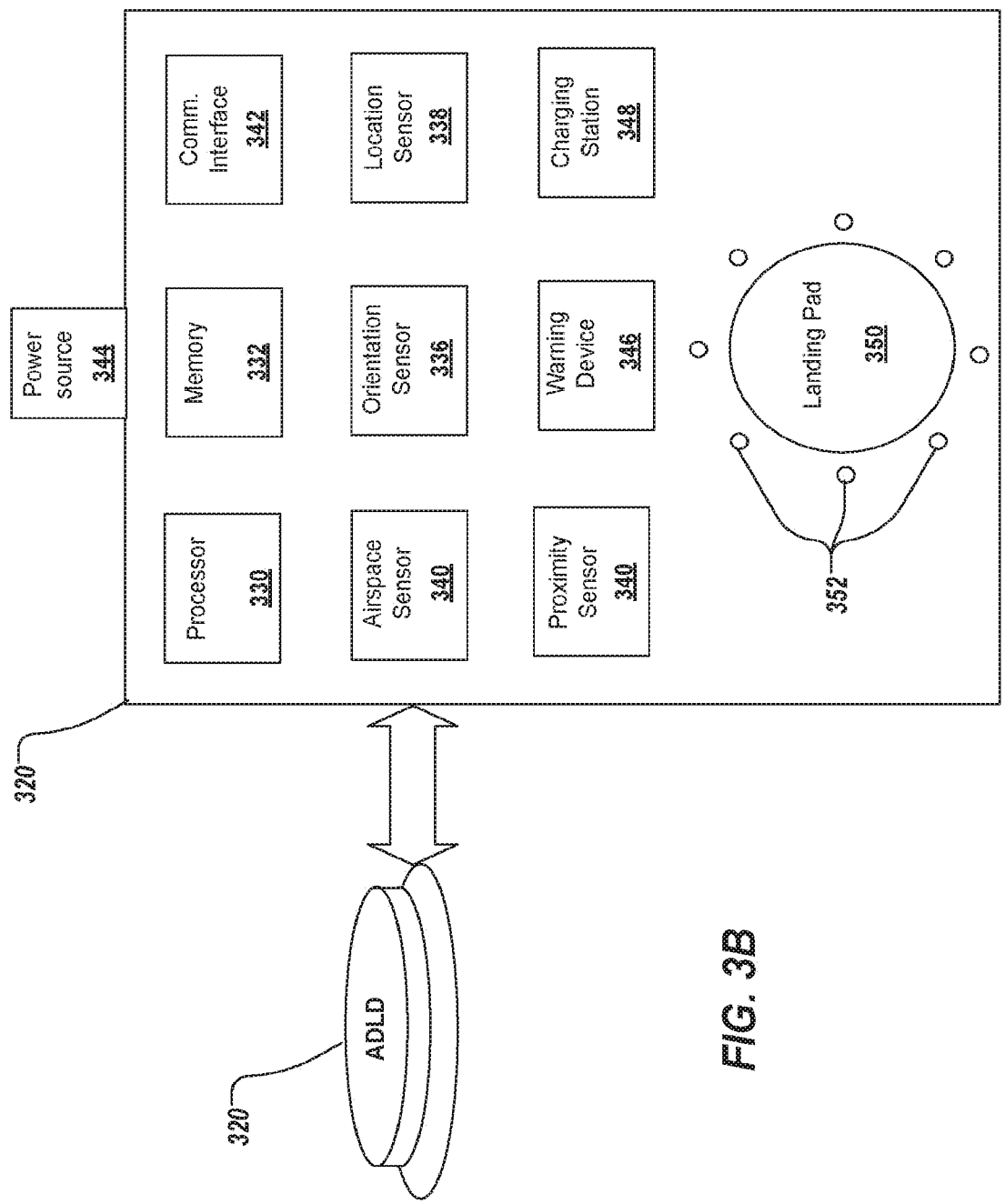
FIG. 3B depicts a block diagram of an example autonomous drone landing device (ADLD) in accordance with implementations of the present disclosure.

FIG. 3B depicts a block diagram of an example ADLD 320 in accordance with implementations of the present disclosure. The ADLD 320 includes one or more processors 330, a computer-readable memory device 332, several sensors (e.g., sensors 334, 336, 338, 340), an electronic communications interface 342, and a power source 344. In addition, the ADLD 320 includes a landing pad 350. The processor(s) 330 can execute instructions stored by the computer-readable memory device 332, control and receive data from the sensors 334, 336, 338, 340 and communications interface 342, and can control other, optional, features of the ADLD 320 described below.

The sensors can include, for example, airspace sensors 334, orientation sensors 336, location sensors 338, and proximity sensors 340. The airspace sensors 334 can include imaging and ranging sensor (e.g., a camera, radar transceivers, sonar transducers). The airspace sensors 334 are configured to obtain data indicating obstructions located in or near the airspace above the landing pad 350. For example, the airspaces sensors 334 can obtain images of the airspace above the landing pad 350. The ADLD 320 or the drone control platform can use the images to detect obstructions in the airspace and define boundaries for a drone approach corridor. In addition, the airspace monitors are configured to obtain data indicating the position of drones within a drone approach corridor (e.g., the position of a drone in relation to boundaries of a drone approach corridor). The drone position data can include, for example, visible, IR, radar, or sonar images of the drone within the approach corridor, RF triangulation data, radar or sonar ranging data, or WiFi positioning data. The ADLD 320 can use the drone position data to monitor the position of a drone flying within a drone approach corridor above the landing pad 350 and guide the drone in landing at the landing pad 350.

The orientation sensors 336 can be configured to provide data related the orientation of the landing pad 350. For example, orientation sensors 336 can include electronic levels or accelerometers that are configured to detect the orientation of the landing pad 350 with respect to direction of a gravitational force. The ADLD 320 can use the orientation data to determine whether the landing pad 350 is sufficiently level for a drone to land on the landing pad 350.

In some examples, the orientation data can be used to determine the line of sight of airspace sensors 334. In some implementations (not shown), the landing pad 350 is separate from the ADLD and the orientations sensors 336 can be integrated with or attached to the landing pad 350. In such implementations, the orientation sensors 336 can be coupled with the processor 330 of the ADLD 320, for example, by a wired or wireless data link.

The location sensors 338 can be configured to provide data related the location of the ADLD 320. For example, location sensors 338 can include GPS receivers or WiFi positioning system sensors. The ADLD 320 can use the location data to register the location of the ADLD 320 and the associated drone approach corridor with the drone control platform. In some examples, the location data can be used in conjunction with the airspace data and orientation data to determine an entry point for a drone approach from a drone highway. For example, the angle of the landing pad 350 and airspace sensors 334 can be used to determine the location of a vertical (e.g., with respect to the ground or gravity) portion of the drone approach corridor with respect to a drone highway. For example, angle of the landing pad 350 and airspace sensors 334 can be used to determine a displacement of an upper end of the vertical portion of the drone approach corridor with respect to the location of the ADLD 320 on the ground.

The proximity sensors 340 can be configured to detect objects (e.g., people or animals) that are within a threshold distance of the landing pad 350. For example, the ADLD 320 can use the proximity sensor data to determine whether person or animal is too close (e.g., within a threshold safety distance) of the landing pad 350 when a drone is approaching.

The electronic communications interface 342 can include, for example, a computer network communication interface (e.g., a WiFi or Bluetooth interface), a cellular communication interface (e.g., an LTE interface), and/or an RF communication interface. The electronic communications interface 342 can be configured to communicate with computing systems that host a drone control platform, drone flight controllers, and user computing devices (e.g., computing device 322 of FIG. 3A). In some examples, the electronic communications interface 342 can include adapters that enables the ADLD 320 to communicate flight controller agnostic course corrections to any drone flight controller in a format that can be executed by the flight controllers.

The power supply 344 provides power to the ADLD 320. The power supply 344 can be a self-contained power supply (e.g., a battery) or a connection to an external power supply (e.g., a power converter and connection cable).

In some examples, the ADLD 320 can include a warning device 346. For example, the warning device 346 can include visual and/or audible indicators to alert bystanders that a drone entering the drone approach corridor and will be landing. Visual indicators can include, for example, lights (e.g., flashing LEDs, strobe lights), and audible indicators can include, for example, a siren, alarm, or verbal warning system. For example, when the ADLD 320 receives an indication that a drone is entering an associated drone approach corridor, the ADLD 320 can initiate the warning device 346 to alert bystanders of the approaching drone.

In some examples, the ADLD 320 can include a charging station 348. For example, the drone charging station 348 can be integrated with the landing pad 350 so that a drone that lands at the landing pad 350 can be recharged (e.g., while waiting for instructions to take-off). The charging station can provide power from the power source 344 to recharge a drone's batteries while it is located on the landing pad 350. In some examples, the charging station 348 can be a wireless power transfer device (e.g., a wireless charging station) that uses electromagnetic resonance to transfer energy to a drone's battery.

In some examples, the landing pad 350 can include a plurality of light sources 352 to guide a drone's approach to the landing pad 350. For example, the lights sources 352 can be located around the perimeter of the landing pad 350. The light sources 352 can be, for example, visible or IR light sources.

In some implementations, (as shown) the ADLD 320 is integrated with the landing pad 350 (e.g., the landing pad can be on an upper surface of the ADLD 320). In some implementations (not shown), the landing pad 320 can be separate from the ADLD 320. Although separate, in such implementations, the landing pad 350 can be coupled to the ADLD 320 (e.g., through a wired or wireless data link) to communicate data and control signals between the ADLD 320 and sensors (e.g., orientation sensors 336) and/or light sources 352 attached to the landing pad 350.

Figure 3C:
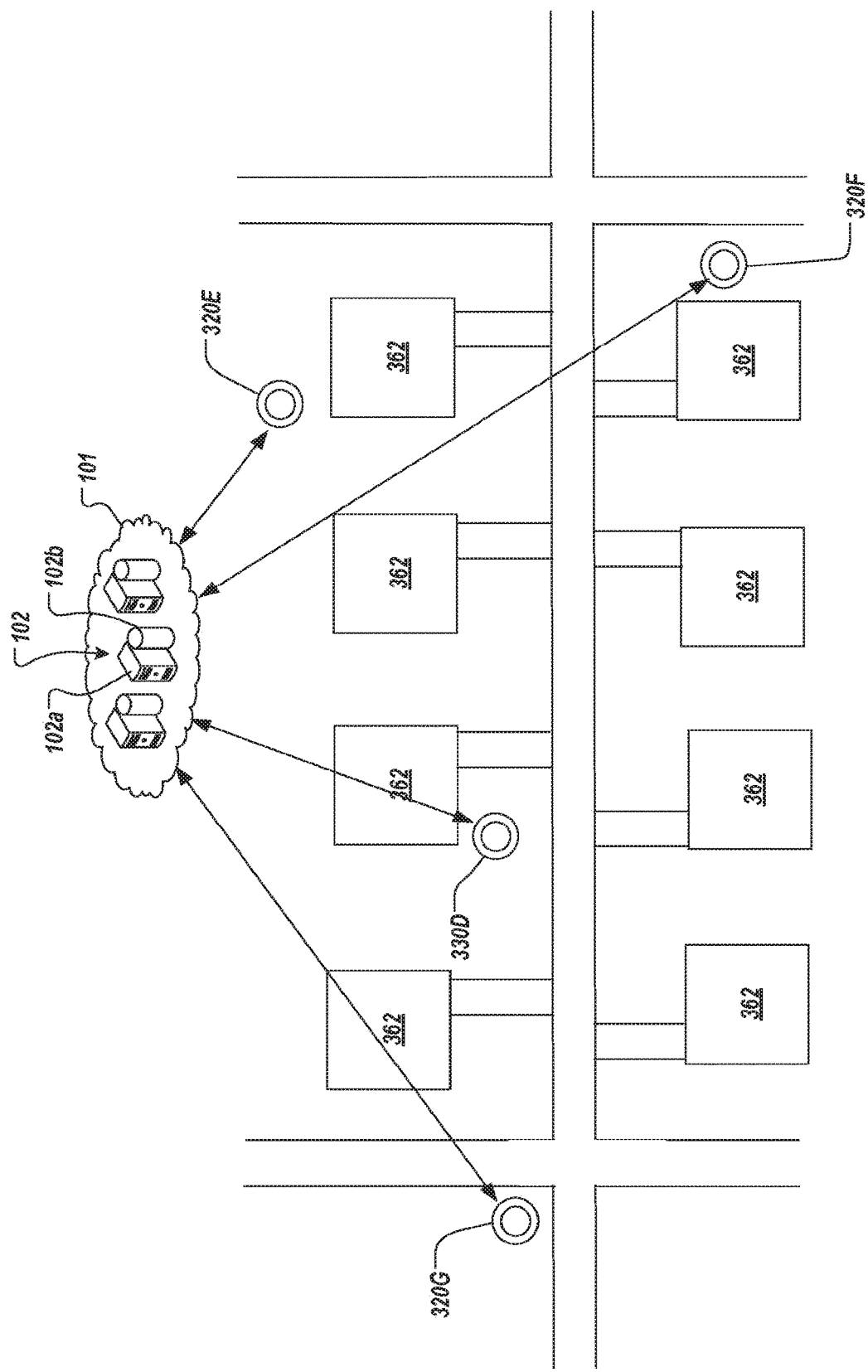
FIG. 3C depicts an example network of ADLDs in accordance with implementations of the present disclosure.

FIG. 3C depicts an example network of ADLDs 360 in accordance with implementations of the present disclosure. The network of ADLDs 360 includes multiple ADLDs 320D-320G that are registered with a drone control platform. The ADLDs 320D-320G are each in communication with the cloud computing system 101. For example, the ADLDs 320 may be configured by users for landing drones at various houses 362 within a neighborhood, businesses at a shopping center or business park, warehouses at a shipping facility, etc.

In some examples, ADLD users can select one or more secondary (e.g., backup) ADLDs 320D-320G for drones in case the user's ADLD 320D-320G becomes obstructed or otherwise inoperable. For example, a user of ADLD 320D can designate a neighbor's ADLD (e.g., ADLD 320E) as a backup landing location and approach corridor for the user's ADLD 320D. If the user's ADLD 320D becomes obstructed, the drone control platform can reroute drones that request to land at the user's landing site to the user's designated backup ADLD 320E.

In some examples, a particular ADLD (e.g., ADLD 320G) can be associated with multiple users. For example, ADLD 320G may be associated with a drone landing site that is shared by members of a neighborhood or several businesses in a shopping center. In such examples, when the ADLD 320G registers with the drone control platform, the registration information can include information related to each of the shared users (e.g., drone delivery account information and contact information). In some examples, the drone control platform can use the users' information to inform the appropriate user when a drone is delivering an object for the user. In some examples, the drone control platform can also use the users' information to inform businesses that support drone based object pickup or delivery of users that are authorized to received/send objects from the ADLD 320G.

FIGS. 4-7 depict flowcharts of respective example processes that can be executed in accordance with implementations of the present disclosure. As discussed above, a drone control platform can control drone flights during various flight stages including: a pre-flight stage, an in-flight stage, and a post-flight stage. The following flowcharts illustrate example flight control processes for each of a pre-flight stage, an in-flight stage, and a post-flight stage.

Figure 4:
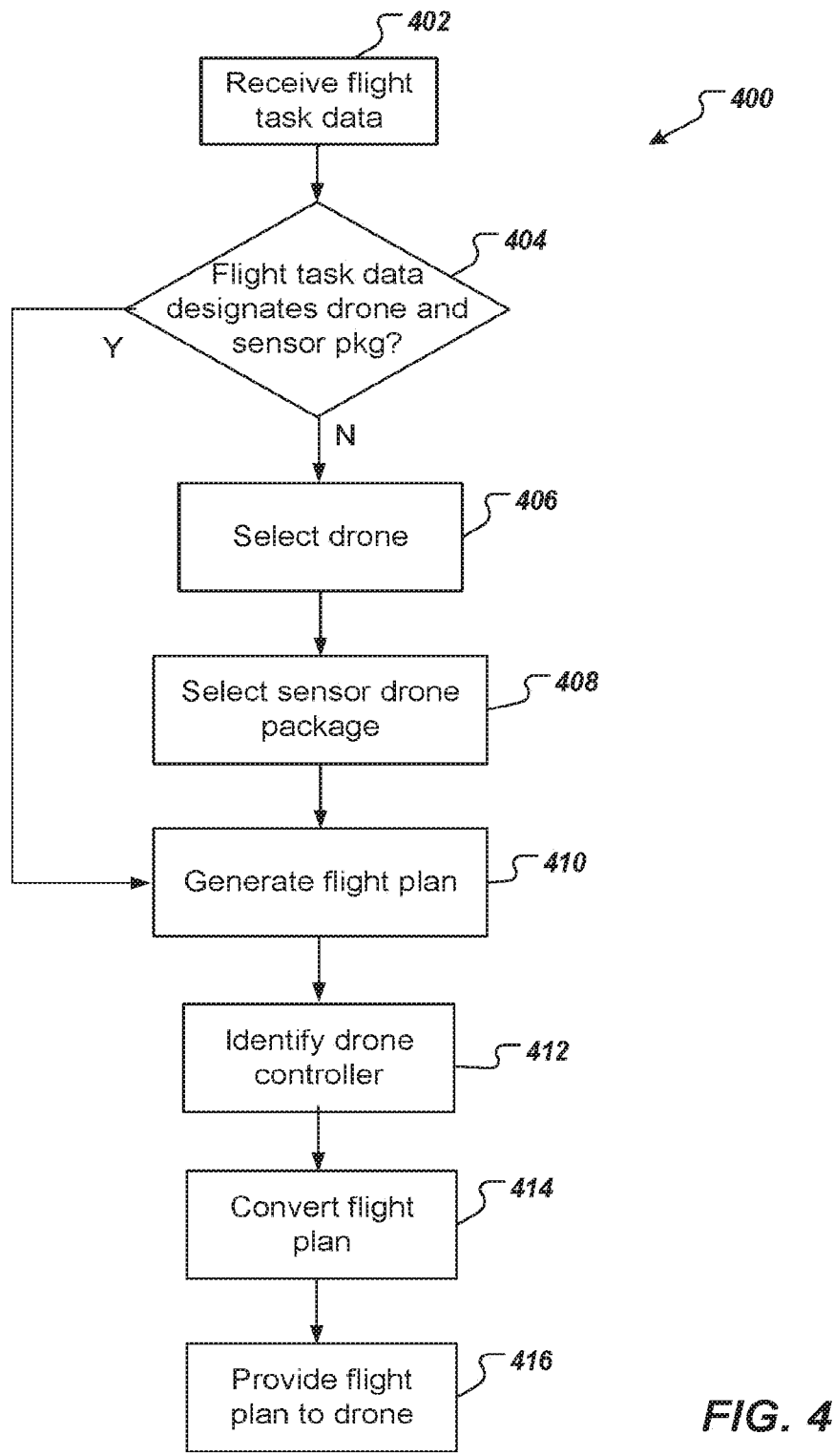
FIGS. 4-9 depict example processes that can be executed in accordance with implementations of the present disclosure.

FIG. 4 is a flowchart illustrating an example process 400 during a pre-flight stage that can be executed in accordance with implementations of the present disclosure. In some implementations, the example process 400 can be realized using one or more computer-executable programs that are executed using one or more computing devices (e.g., a cloud computing system 101, as shown in FIG. 1 and described above). In some implementations, the example process 400 can be used for generating a drone flight plan.

Flight task data is received (402). For example, a user can submit flight task data identifying a desired flight task for a drone. In some examples, the flight task data can designate a drone and/or a sensor package for executing the task (404). For example, a user requesting a drone flight plan may designate a drone type and sensor package. If so, process proceeds to step 410. If not, the drone control platform can select a drone (406) and a sensor package (408). For example, a user can register a drone inventory with the drone control platform. The drone control platform can select an appropriate drone and sensor package to perform the flight task based on the flight task data and the user's registered inventory. In some examples, the drone control platform can pair a drone service requestor with a drone service provider and select an appropriate drone to execute requested task from the drone service provider's registered drone inventory. In some examples, the drone control platform can select a drone based on drone performance metrics based on historical flight data from a computer learning system.

A flight plan is generated for the drone (410). For example, the drone control platform can generate a flight plan based on the flight task data. In some examples, the drone control platform can generate a flight plan based on the flight task data and additional information stored by the drone control platform (e.g., drone performance metrics) and/or third-party information (e.g., weather information, land topography information, and airspace information). In some examples, the flight plan is flight controller agnostic. The drone's flight controller type is identified (412). The flight plan is converted to a format compatible with the drone's flight controller (414). For example, the drone control platform can adapt a flight controller agnostic flight plan to a format that is executable by the drone's particular type of flight controller.

The flight plan is provided to the drone 416. In some examples, the flight plan can be transmitted directly to the drone. In some examples, the flight plan can be transmitted to a user's computing device, and the user can upload the flight plan to the drone.

In some examples, the flight plan can be reevaluated occasionally or regularly before the flight plan is executed. For example, process 400 (or portions thereof) can be repeated before the flight plan is executed. For example, third-party information (e.g., FAA information, weather information, etc.) can be monitored to check for changes or updates. For example, if weather conditions become unsuitable for the flight, the flight plane can be rescheduled and the user informed of the change. As another example, if the FAA establishes a temporary flight restriction (TFR) that affects the flight plan (e.g., the President may be visiting an area over which the drone is scheduled to fly), the flight plan can be modified (e.g., a waypoint moved) or the flight rescheduled in accordance with the TFR.

Figure 5:
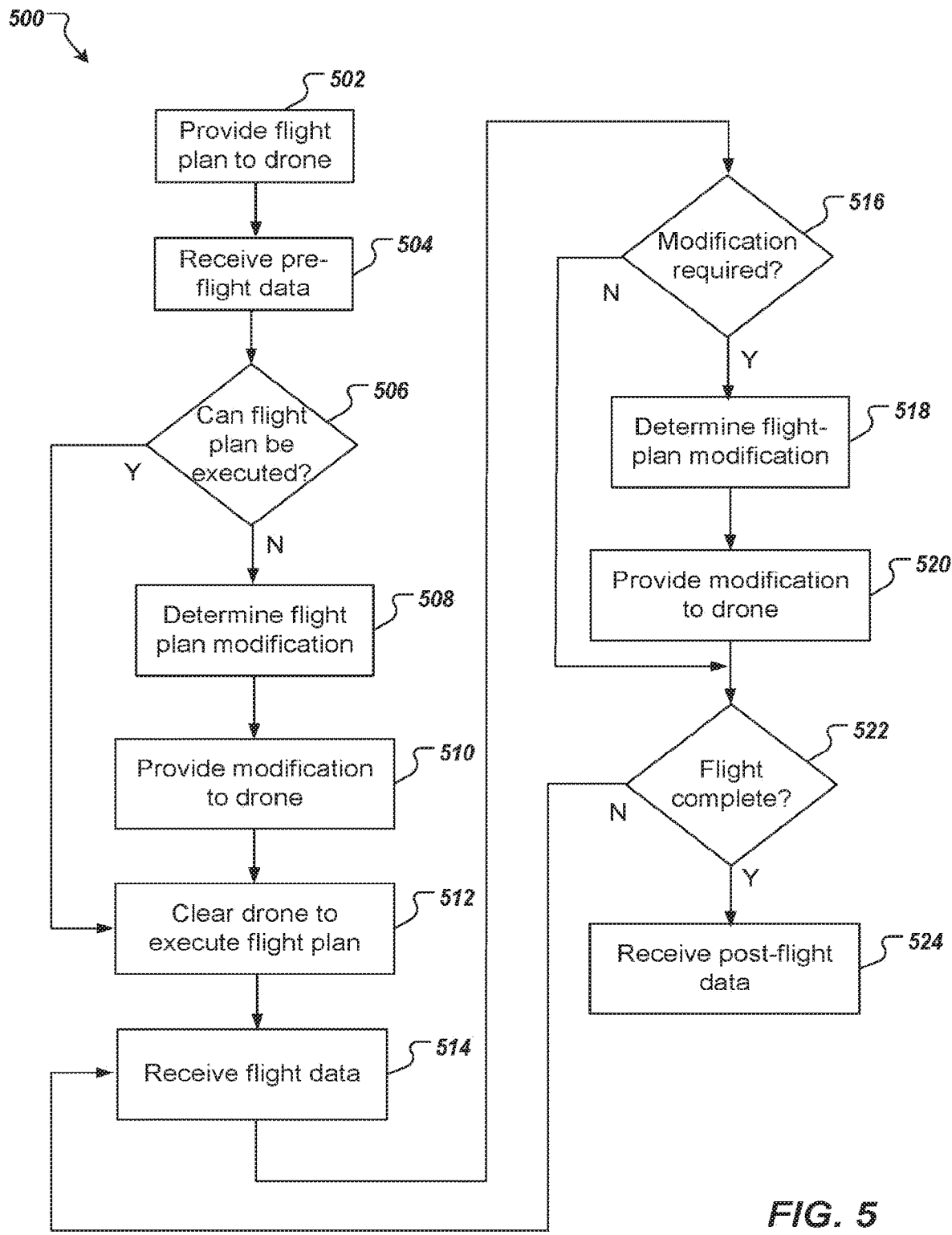

FIG. 5 is a flowchart illustrating an example process 500 during an in-flight stage that can be executed in accordance with implementations of the present disclosure. In some implementations, the example process 500 can be realized using one or more computer-executable programs that are executed using one or more computing devices (e.g., a cloud computing system 101, as shown in FIG. 1 and described above). In some implementations, the example process 500 can be used for executing a drone flight plan.

A flight plan is provided to a drone (502). For example, a flight plan can be generated and provided to a drone as discussed above in reference to process 400. Pre-flight data is received (504). For example, the drone control platform can obtain pre-flight data from the drone, third-party systems, or the drone control platform itself (e.g., data related to other drone flight plans). Pre-flight data can include, for example, diagnostic data received from the drone, environmental data, and airspace data. For example, pre-flight diagnostic data can include the location of the drone, battery status, and other appropriate data. Environmental data can include, for example, current weather conditions. Airspace data can include, for example, information related to other aircraft and drones that may interfere with the drone's flight plan.

It is determined whether the flight plan can be executed (506). For example, the drone control platform can determine based on the pre-flight data whether the drone can execute the flight plan or whether the flight plan must be modified. If it is determined that the drone can complete the flight plan, the process proceeds to step 512. If not, a flight plan modification is determined (508). For example, the drone control platform can modify the flight plan based on the pre-flight data. Modifications can include, for example, scheduling changes, changes to waypoints, changes to flight profiles between waypoints, changes to planned sensor operations, the flight can be delayed or canceled, or all or part of the flight plan can be sent to a second drone. For example, a portion of the flight plan can be shared with a second drone if the pre-flight data indicates that the first drone will no longer have the endurance to complete the entire flight plan.

The flight plan modification is provided to the drone (510). In some examples, the flight plan modification can be transmitted directly to the drone. In some examples, the flight plan modification can be transmitted to a user's computing device, and the user can upload the flight plan to the drone. The drone is cleared to execute the flight plan (512). For example, the drone can be provided with a command to begin execution of the flight plan. Flight data is received (514). The drone can send flight data to the drone control platform while the drone is in-flight executing the flight plan. The flight data can include, for example, battery status, speed, altitude, location data (e.g., GPS data), and sensor data (e.g., data obtained by the drones sensor package such as camera images).

It is determined whether a flight plan modification is required (516). For example, the drone control platform can determine whether a modification of the flight plan is needed based on the flight data received from the drone. In some examples, the drone control platform can determine whether a modification of the flight plan is needed based on other drone control platform data (e.g., flight plans for other drones) and information from third-party systems (e.g., weather data, airspace data). For example, the drone control platform can predict whether the drone will have the endurance required to complete the flight plan. The drone control platform can determine whether the drone is obtaining good sensor data. The drone control platform can determine whether the flight plan should be modified based on external conditions (e.g., weather or unexpected air traffic).

If a modification is not needed, the process proceeds to step 522. Otherwise, a flight plan modification is determined (518). For example, the drone control platform can modify the flight plan based on the drone flight data, other drone control platform data, or environmental data. In-flight modifications can include, for example, changes to waypoints, changes to flight profiles between waypoints, changes to sensor operations, the arrivals at flight destinations can be rescheduled, a flight destination can be replaced (e.g., with a backup destination), or a portion of the flight plan can be canceled and sent to a second drone.

The flight plan modification is provided to the drone (520). For example, the flight plan modification can be provided to the drone as described above. If the flight is not complete (522), the process returns to step 514. If the flight is complete, post-flight data is received (524). Post-flight data can include drone flight data and sensor data that was not previously received. In some examples, post-flight data includes all of the flight data and sensor data obtained during execution of the flight plan as well as any flight plan modifications sent to the drone.

Figure 6:
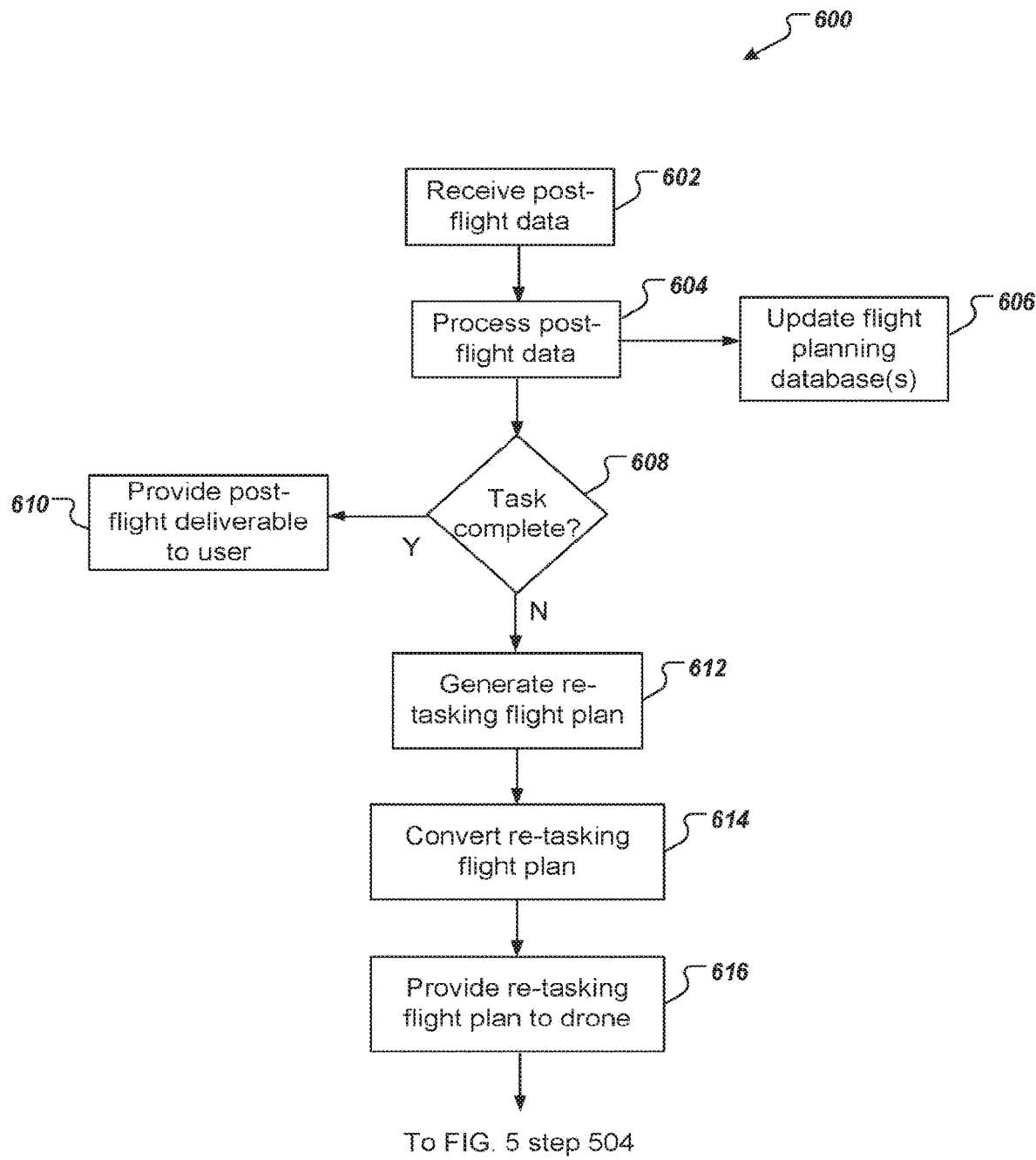

FIG. 6 is a flowchart illustrating an example process 600 during a post-flight stage that can be executed in accordance with implementations of the present disclosure. In some implementations, the example process 600 can be realized using one or more computer-executable programs that are executed using one or more computing devices (e.g., a cloud computing system 101, as shown in FIG. 1 and described above). In some implementations, the example process 600 can be used for evaluating the execution of a drone flight plan.

Post-flight data is received (602). For example, a flight plan can be executed and post-flight data received from a drone as discussed above in reference to process 500. The post-flight data is processed (604). For example, the drone control platform can process the post flight data to generate flight deliverables for users. Flight planning database(s) are updated (606). For example, the drone control platform can perform computer learning analysis on the post-flight data to update flight planning databases. For example, flight planning databases can include data such as, but not limited to, location profiles, drone performance metric profiles, and sensor package performance profiles.

It is determined whether the task was completed (608). The drone control platform can analyze the post-flight data to determine whether the task(s) associated with the flight plan were complete. If so, post-flight deliverables can be provided to a user (610). If not, a re-tasking flight plan is generated (612). For example, the drone control platform can generate a re-tasking flight plan to complete any tasks that were not completed. The re-tasking flight plan is converted to a format compatible with the drone's flight controller (614). For example, the drone control platform can adapt a flight controller agnostic flight plan to a format that is executable by the drone's particular type of flight controller. The re-tasking flight plan is provided to the drone (616), and executed as described above in reference to process 500.

Figure 7:
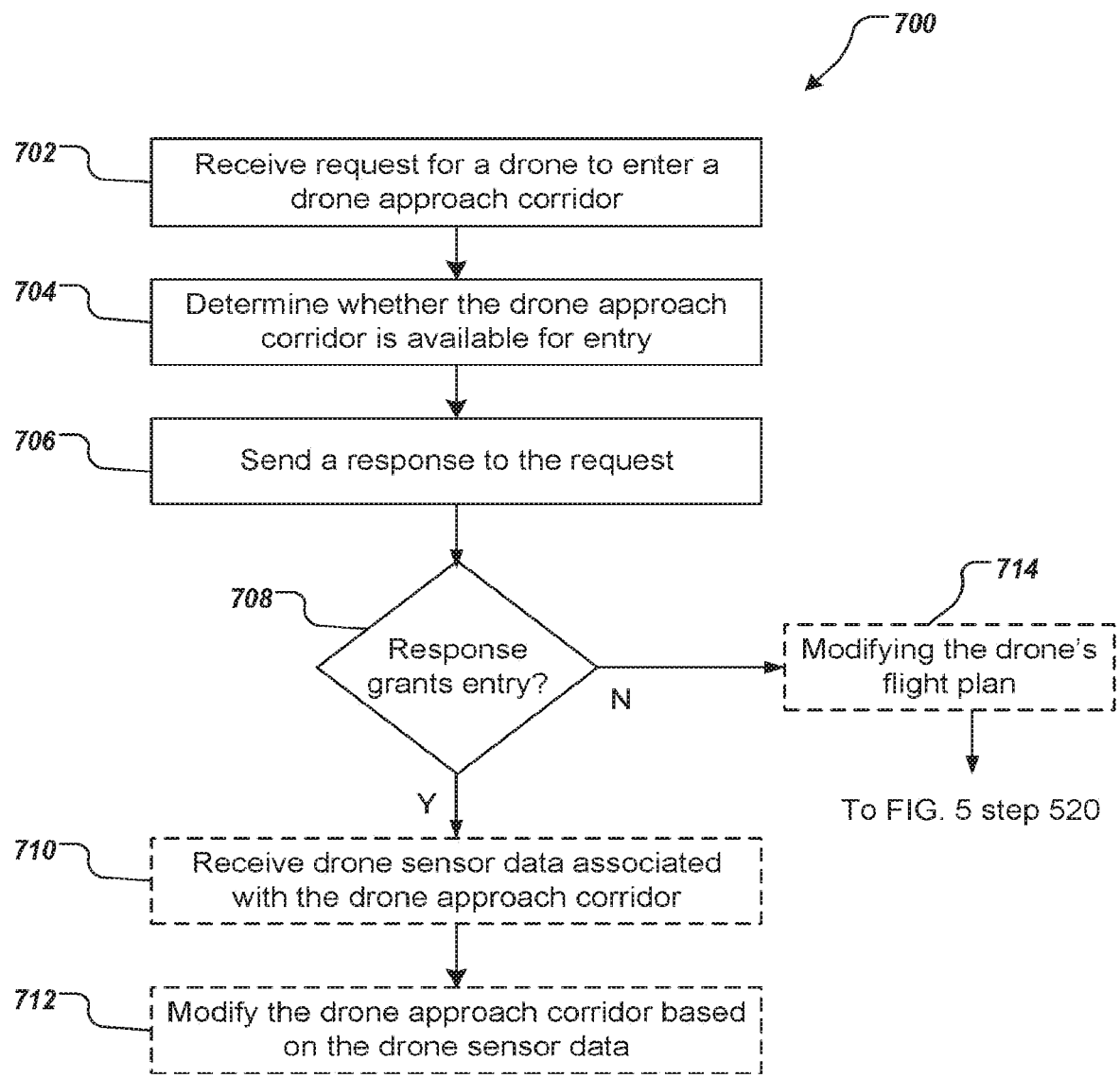

FIG. 7 is a flowchart illustrating an example process 700 of controlling drone access to a drone approach corridor that can be executed in accordance with implementations of the present disclosure. In some implementations, the example process 700 can be realized using one or more computer-executable programs that are executed using one or more computing devices (e.g., a cloud computing system 101, as shown in FIG. 1 and described above). In some implementations, the example process 700 can be used for controlling drone approaches to and/or landings at a geographical location.

A request for a drone to entry a drone approach corridor is received (702). For example, a drone can send a drone approach corridor entry request to a drone control platform. The request can include, for example, an identity of the drone approach corridor (e.g., a serial number), a location of the corridor or an identity of a target location associated with the corridor, an identity of the requesting drone, information about the requesting drone (e.g., battery charge status), environmental information (e.g., current wind speed/ weather conditions), and a duration of time that the drone will occupy the corridor. In some examples, the drone submitting the request may have been pre-scheduled to enter the dream approach corridor. In such examples, the request can include simply an identity of the drone that can be verified against drone approach corridor scheduling data.

It is determined whether the drone approach corridor is available for the requesting drone to enter (704), and a response to the drone approach entry request is sent to the requesting drone (706). The drone corridor may be available for the requesting drone to enter so long as, for example, the corridor is not occupied by another drone, is not scheduled to be occupied by another drone within a predetermined time from receipt of the request, has not become inaccessible (e.g., by an obstruction, such as a fallen tree branch), the requesting drone does not violate a collision avoidance protocol of the drone approach corridor (e.g. the requesting drone is not too large to enter the corridor), or the environmental conditions do not violate a collision avoidance protocol of the drone approach corridor (e.g., the wind speed does not exceed a maximum value for safe operation/ navigation within the corridor).

For example, determining whether the drone approach corridor is available for the requesting drone to enter can include determining that another drone is not present in or scheduled to use the drone approach corridor. For example, the drone control platform may have previously granted permission for a first drone to enter the drone approach corridor and may receive a request to enter the same corridor from a second drone before receiving a notification that the first drone has exited the corridor. In such situations, the drone control platform can deny or delay granting access permission to the requesting drone.

In another example, the drone control platform may receive a request to enter a drone approach corridor at a time that would not permit sufficient time for the requesting drone to enter and exit the corridor before a time that another drone is pre-scheduled to use the corridor. In such situations, the drone control platform can deny or delay granting access permission to the requesting drone. On the other hand, the platform can grant permission for the requesting drone to access the corridor, if, at the time the request is received, there would be sufficient time before the arrival of the pre-scheduled drone for the requesting drone to enter and exit the drone approach corridor.

In some examples, the drone control platform can determine whether a drone approach corridor is available for a requesting drone to enter by comparing a time of the request and an identity of the requesting drone to a corridor access schedule. If the requesting drone is pre-scheduled to enter the drone approach corridor and the time of the request corresponds to the drone's scheduled drone approach corridor access time, the platform can grant the corridor access request.

In some examples, the drone control platform can determine, for example, from drone flight data or an ADLD that a drone approach corridor is obstructed and unsafe for drone operations. In some examples, the drone control platform can determine that a drone approach corridor is unavailable if the platform does not receive a liveness signal (e.g., heartbeat signal) from an associated ADLD within a predetermined period of time, thus indicating that the ADLD is offline. In such examples, the platform can deny access to the requesting drone. In some examples, the platform can re-route the requesting drone to a secondary drone approach corridor.

If the response grants entry (708), the requesting drone has permission to enter the drone approach corridor. In some implementations, sensor data that is associated with the drone approach corridor can be received from the requesting drone (710). For example, the sensor data can include images of the target location and flight profile information (e.g., speed, location, altitude, descent/ascent rate, etc.) of the requesting drone as it navigates the drone approach corridor. If necessary, the drone approach corridor can be modified based on the received drone sensor data (712). For example, the sensor data can be analyzed to determine whether and, if so, how to modify attributes of the drone approach corridor. For example, an analysis of images of the target location may reveal a new obstruction that could interfere with drone operations within the drone approach corridor. In response, attributes of the drone approach corridor (e.g., the location, dimensions, or collision avoidance protocols (e.g., stand-off distances) can be modified to improve the safety of drone operations within the corridor.

If the response denies entry (708), the requesting drone does not have permission to enter the drone approach corridor. In some implementations, the response to the requesting drone's entry request can identify a holding pattern for the requesting drone to fly while awaiting permission to enter the drone approach. In some examples, the response to the requesting drone's entry request can identify a secondary drone approach corridor for the requesting drone to use. For example, the requesting drone's flight plan can be modified to provide a flight path for the holding pattern or for entering the secondary drone approach corridor (714). As described above in reference to step 520 of FIG. 5, the modification to the flight plan can be sent to the requesting drone. The modification can be sent with the response to the drone's entry request, and executed as described above in reference to process 500.

In some examples, the drone control platform can receive drone approach corridor entry requests from drones that are not controlled by the platform or drones operating in accordance with flight plans that have not been generated by the drone control platform. For example, the requesting drone may be controlled by or operating in accordance with a flight plan generated by a drone control system different from the drone control platform or independent of a drone control platform. In such examples, when granting access to a drone approach corridor, the drone control platform can provide a temporary flight plan to the requesting drone that defines, for example, a flight path, approach to, and collision avoidance protocols for entry into the approach corridor. The temporary flight plan can be a drone flight controller agnostic flight plan, and, as described above, can be converted to a format compatible with the requesting drone's flight controller. For example, the drone control platform can adapt a flight controller agnostic flight plan to a format that is executable by the requesting drone's particular type of flight controller.

Figure 8:
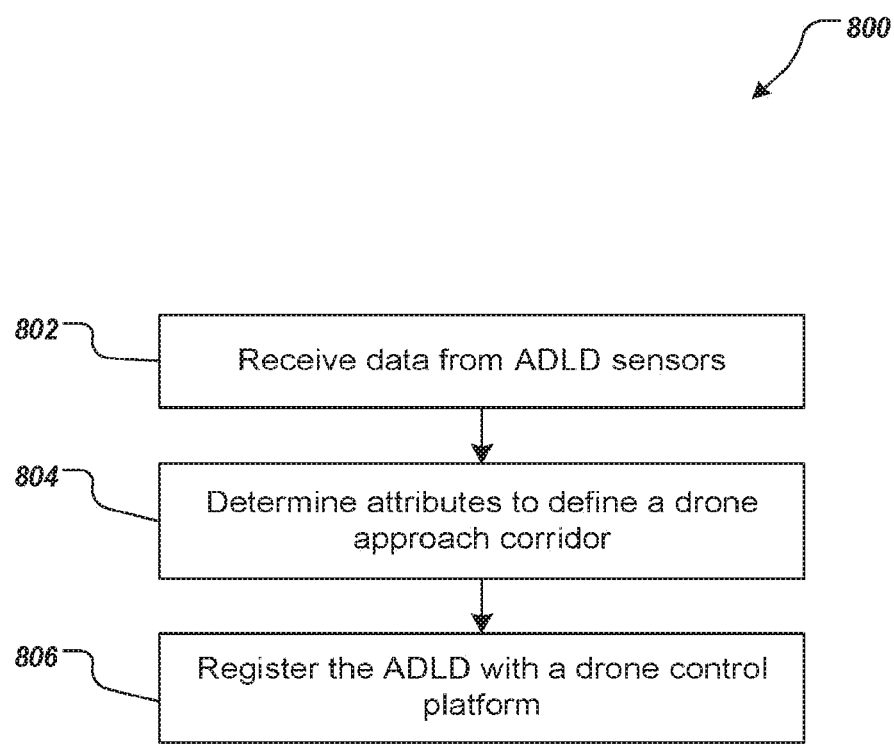

FIG. 8 is a flowchart illustrating an example process 800 for configuring an ADLD that can be executed in accordance with implementations of the present disclosure. In some implementations, the example process 800 can be realized using one or more computer-executable programs that are executed by an ADLD (e.g., as shown in FIGS. 1 and 3A-3C, and described above). In some implementations, the example process 800 can be used for initializing a new ADLD or reconfiguring an ADLD in a new location. In some implementations, the example process 800 can be realized using one or more computer-executable programs that are executed using one or more computing devices (e.g., a cloud computing system 101, as shown in FIG. 1 and described above).

Data is received from an ADLD sensor (802). For example, the data can include data that represents the airspace above the ADLD (e.g., airspace data), orientation data that indicates an orientation of a landing pad associated with an ADLD, and location data that indicates a geographic location of the ADLD. The airspace data can include, for example, visual, IR, radar, or sonar images of the airspace above the landing pad. The orientation data can include, for example, data from electronic levels or accelerometers that are configured to detect the orientation of the landing pad with respect to direction of a gravitational force. Location data can include, for example, GPS or WiFi positioning data such as latitude, longitude, and, in some cases, altitude. In some implementations, the data can be received from the ADLD by a drone control platform.

Attributes to define a drone approach corridor are determined (804). For example, attributes to define a drone approach corridor can be determined based on the sensor data, the orientation data, and the location data. Attributes to define a drone approach corridor can be attributes that regulate drone operations within the associated airspace. For example, attributes to define a drone approach corridor can include, but are not limited to, a location of the drone approach corridor (e.g., geographical coordinates of the ADLD and an entry point for a drone approach corridor from a drone highway), boundaries of the drone approach corridor, procedures for drones to request access to the drone approach corridor, and collision avoidance protocols for drone operations within the drone approach corridor. For example, as described above, airspace data (e.g., images) can be used to determine boundaries for a drone approach corridor and to identify obstructions near or within a drone approach corridor. For example, orientation data can be used determine whether the landing pad is sufficiently level for a drone to land on the landing pad. In some examples, the orientation data can be used in conjunction with the airspace data to determine the line of sight of airspace sensors on the ADLD.

In some examples, the location data can be used in conjunction with the airspace data and orientation data to determine an entry point for a drone approach from a drone highway. For example, the angle of the landing pad and airspace sensors can be used to determine the location of a vertical (e.g., with respect to the ground or gravity) portion of the drone approach corridor with respect to a drone highway. For example, angle of the landing pad and airspace sensors can be used to determine a displacement of an upper end of the vertical portion of the drone approach corridor with respect to the location of the ADLD on the ground.

In some implementations, attributes of the drone approach corridor can be determined by a drone control platform. In some implementations, some of attributes of the drone approach corridor can be determined by the ADLD and some can be determined by the drone control platform.

The ADLD is registered with a drone control platform (806). For example, the ADLD can register with a drone control platform by sending registration information to the drone control platform. For example, registration information can include, but is not limited to, a unique identifier assigned to the ADLD (e.g., a serial number), location of the ADLD, user information (e.g., a login identity and password for the platform or a drone delivery system, and user contact information), secondary ADLDs or drone approach corridors associated with the ADLD (e.g., a backup ADLD or approach corridor), and data defining the drone approach corridor associated with the ADLD (e.g., location and boundaries of the corridor) or ADLD sensor data that the drone control platform can use to define an approach corridor associated with the ADLD.

In some examples, an obstruction may be detected in the airspace above the ADLD from the sensor data. For example, a tree branch may be identified in an image of the airspace. Upon determine that the airspace is obstructed a user can be alerted to the obstruction. For example, a notification can be sent to the user's computing device to alert the user to the obstruction. The notification can provide instructions for the user to clear the airspace, for example, by moving the ADLD in a particular direction away from the obstruction. In some examples, the notification can include a graphical representation of the airspace and the obstruction. In addition, the notification can be sent to the user's computing device through e-mail, SMS message, or through an application. For example, the notification can be sent through an ADLD application, which can display the graphical image and instructions to the user.

Figure 9:
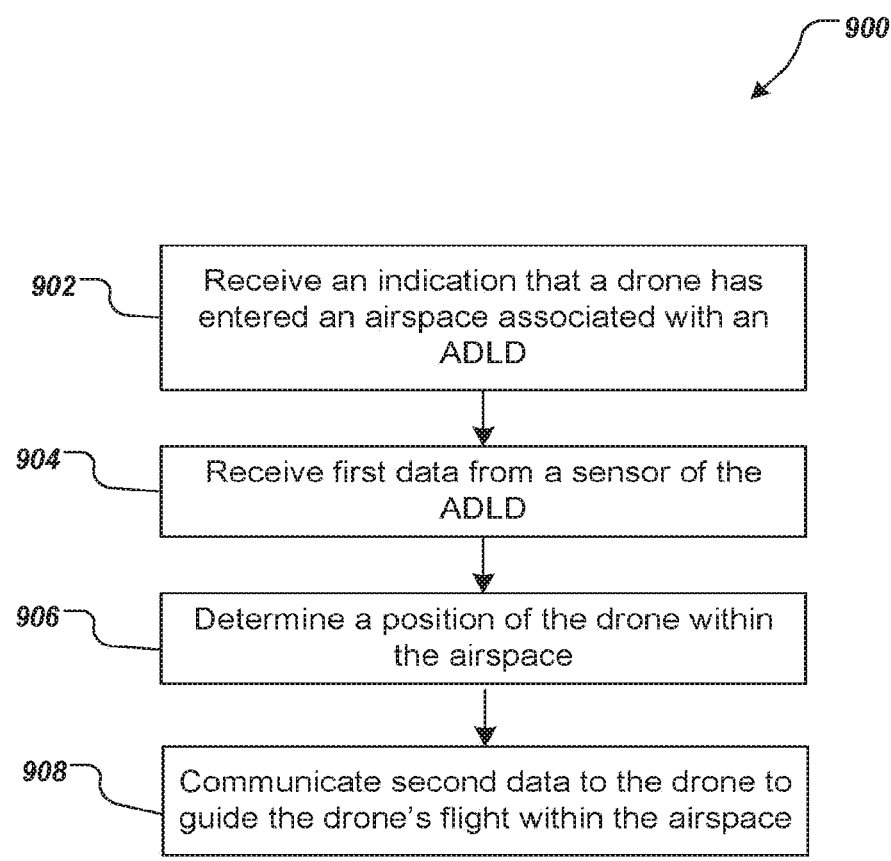

FIG. 9 is a flowchart illustrating an example process 900 for coordinating a drone approach to a landing site with an ADLD that can be executed in accordance with implementations of the present disclosure. In some implementations, the example process 900 can be realized using one or more computer-executable programs that are executed by an ADLD (e.g., as shown in FIGS. 1 and 3A-3C, and described above). In some implementations, the example process 900 can be performed by an ADLD for guiding a drone's approach, descent, and/or ascent to/from a landing site associated with the ADLD.

An indication that a drone has entered an airspace associated with an ADLD is received (902). For example, the airspace can be defined, in part, by a boundary. For example, the airspace can be a drone approach corridor associated with the ADLD. In some examples, the indication can be sent from a drone to the ADLD when the drone enters the drone approach corridor associated with the ADLD. In some examples, the indication can be sent from a drone control platform to the ADLD when the drone enters the drone approach corridor associated with the ADLD.

First data is received from a sensor of the ADLD (904). For example, the first data can be airspace data received from an airspace sensor that is configured to monitor the airspace associated with an ADLD. The first data can be, for example, images of the airspace and position of the drone within the airspace, radar or sonar range data indicating the range of the drone from the ADLD, or positioning data (e.g., RF triangulation data or WiFi positioning data) indicating the position of the drone within the airspace.

A position of the drone within the airspace is determined (906). For example, the position of the drone can be determined with respect to the boundary of the airspace. For example, the ADLD can determine a drone's distance above the ADLD based on a radar range obtained by a sensor on the ADLD or from altitude data communicated to the ADLD from the drone. The ADLD can determine the drone's proximity to a boundary of the airspace based on a FOV of the images of the airspace, the size of pixels in the image, and the drone's distance from the ADLD.

Second data is communicated to the drone to guide the drone's flight within the airspace (908). For example, the ADLD can determine course corrections for the drone based on the determined position of the drone with respect to the boundary of the airspace. The ADLD can send the course corrections to guide the drone's approach to the landing pad based on the position of the drone within the approach corridor. For example, the ADLD can send course corrections either through direct communication with the drone (e.g., WiFi, RF, IR, Bluetooth) or through the drone control platform.

In some implementations, the second data can be communicated to the drone by varying lighting configurations on the ADLD or on the landing pad of the ADLD. For example, illuminating lights (e.g., visible or IR lights) on one side of the landing pad can instruct the drone to alter its course towards or away from that side of the landing pad. Various light flashing patterns, flashing frequencies, or light wavelengths (e.g., colors) can be used to instruct the drone how much to alter course or to alter a rate of descent/ascent.

Figure 10:
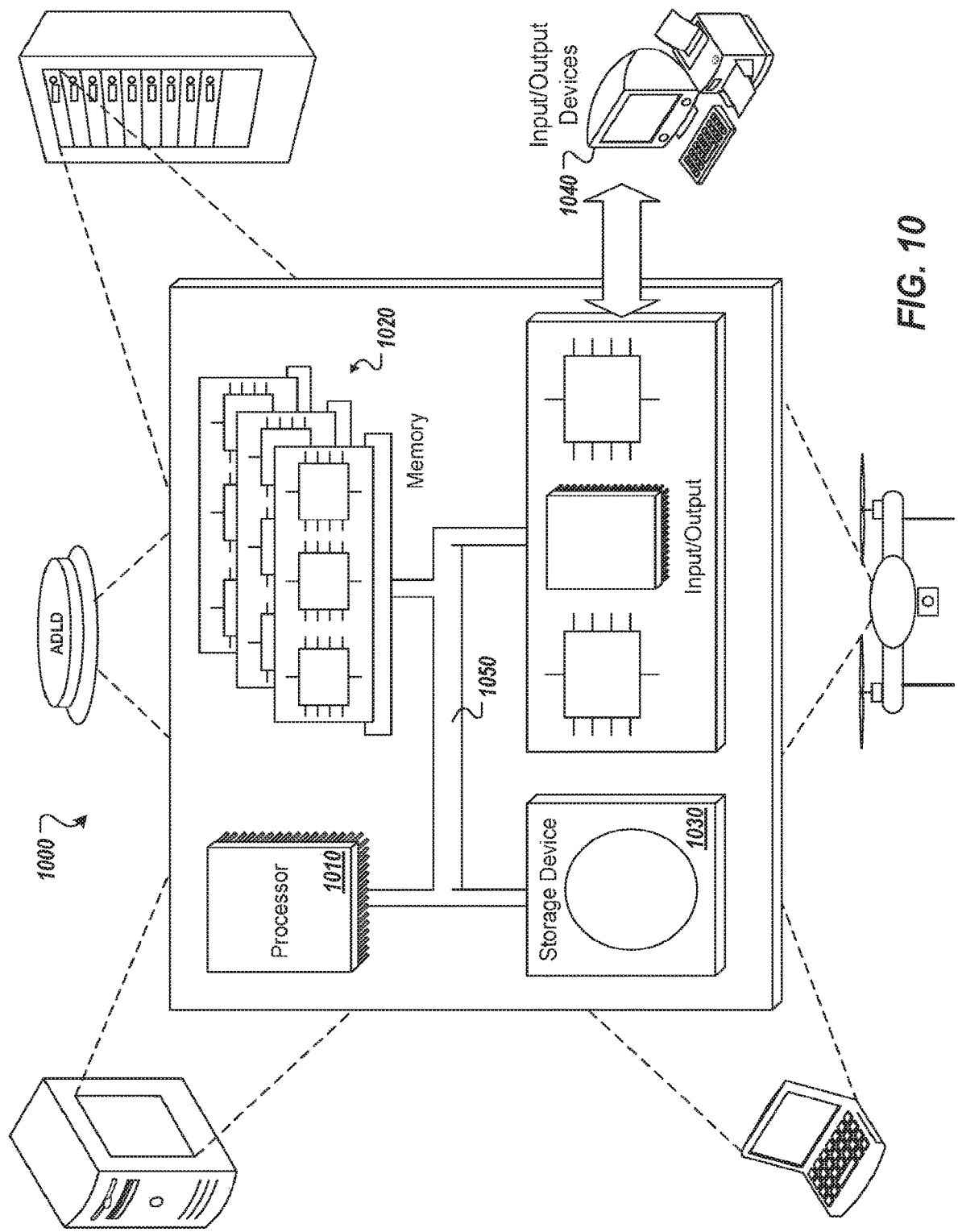
FIG. 10 is a schematic illustration of example computer systems that can be used to execute implementations of the present disclosure.

FIG. 10 is a schematic illustration of example computer systems 1000 that can be used to execute implementations of the present disclosure. The system 1000 can be used for the operations described in association with the implementations described herein. For example, the system 1000 may be included in any or all of the computing components discussed herein to include drone flight control systems and sensor packages; and autonomous drone landing devices. The system 1000 includes a processor 1010, a memory 1020, a storage device 1030, and an input/output device 1040. Each of the components 1010, 1020, 1030, 1040 are interconnected using a system bus 1050. The processor 1010 is capable of processing instructions for execution within the system 1000. In one implementation, the processor 1010 is a single-threaded processor. In another implementation, the processor 1010 is a multi-threaded processor. The processor 1010 is capable of processing instructions stored in the memory 1020 or on the storage device 1030 to display graphical information for a user interface on the input/output device 1040.

The memory 1020 stores information within the system 1000. In one implementation, the memory 1020 is a computer-readable medium. In one implementation, the memory 1020 is a volatile memory unit. In another implementation, the memory 1020 is a non-volatile memory unit. The storage device 1030 is capable of providing mass storage for the system 1000. In one implementation, the storage device 1030 is a computer-readable medium. In various different implementations, the storage device 1030 may be a floppy disk device, a hard disk device, an optical disk device, or a tape device. The input/output device 1040 provides input/output operations for the system 1000. In one implementation, the input/output device 1040 includes a keyboard and/or pointing device. In another implementation, the input/output device 1040 includes a display unit for displaying graphical user interfaces.

Implementations of the subject matter and the functional operations described in this specification can be implemented in digital electronic circuitry, in tangibly-implemented computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non transitory program carrier for execution by, or to control the operation of, data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including, by way of example, a programmable processor, a computer, or multiple processors or computers. The apparatus can also be or further include special purpose logic circuitry, e.g., a central processing unit (CPU), a FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example Linux, UNIX, Windows, Mac OS, Android, iOS or any other suitable conventional operating system A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of submodules, third party services, components, libraries, and such, as appropriate. Conversely, the features and functionality of various components can be combined into single components as appropriate The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a central processing unit (CPU), a FPGA (field programmable gate array), or an ASIC (application specific integrated circuit Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few Computer readable media (transitory or non-transitory, as appropriate) suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN), a wide area network (WAN), e.g., the Internet, and a wireless local area network (WLAN).

The computing system can include clients and servers. A client and server are generally remote from each other and typically interact through a communication network. The relationship of client and server arises by virtue of computer programs running on the respective computers and having a client-server relationship to each other While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be helpful. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

In some examples, a flight plan, modification to a flight plan, or modified flight plan can include a set of instructions that are executable by a drone flight controller to control one or more flight characteristics (e.g., speed, direction, altitude, etc.) of a drone or sensor operations on a drone in accordance with the flight plan, modification to a flight plan, or modified flight plan.

As used herein, the term "real-time" refers to transmitting or processing data without intentional delay given the processing limitations of a system, the time required to accurately obtain data and images, and the rate of change of the data and images. In some examples, "real-time" is used to describe concurrently processing a drone flight data as the drone executes a flight plan (e.g., while the drone is in-flight). Although there may be some actual delays, the delays are generally the data analysis results can be computed within sufficient time such that the results remain relevant to aspects of the drone's flight. For example, flight plan modifications calculated based on drone flight data are computed and transmitted to a drone before the drone's flight progress renders the modifications irrelevant.

Accordingly, the above description of example implementations does not define or constrain this disclosure. Other changes, substitutions, and alterations are also possible without departing from the spirit and scope of this disclosure.

What is claimed is:

1. A computer-implemented method for configuring an autonomous drone landing device (ADLD), the method being executed by one or more processors and comprising:
   receiving, by the one or more processors, sensor data that represents airspace above an ADLD, orientation data that indicates an orientation of a landing pad associated with an ADLD, and location data that indicates a geographic location of the ADLD;
   determining, by the one or more processors, attributes to define a drone approach corridor based on the sensor data, the orientation data, and the location data;
   registering the ADLD with a drone control platform;
   determining, based on the orientation data, that the landing pad is not properly oriented for a drone to land on the landing pad; and
   in response to determining that the landing pad is not properly oriented, alerting a user that the landing pad is not properly oriented.

2. The method of claim 1, wherein the drone approach corridor extends from a drone highway to the landing pad associated with the ADLD.

3. The method of claim 1, wherein the sensor data is one or more images of the airspace.

4. The method of claim 1, further comprising:
   determining, based on the sensor data, that the airspace above the ADLD is obstructed; and
   in response to determining that the airspace above the ADLD is obstructed, alerting a user that the airspace above the ADLD is obstructed.

5. The method of claim 4, wherein alerting the user that the airspace above the ADLD is obstructed comprises providing, for display on a user computing device, a notification that the airspace above the ADLD is obstructed and instructions for the user to relocate the ADLD.

6. The method of claim 5, wherein the notification includes a graphical representation of a location of the obstruction with respect to the ADLD and a direction for the user to move the ADLD away from the obstruction.

7. The method of claim 4, wherein alerting the user that the airspace above the ADLD is obstructed comprises activating an indicator on the ADLD to notify the user that the airspace above the ADLD is obstructed and to indicate a direction in which to move the ADLD away from the obstruction.

8. The method of claim 1, wherein alerting the user that the landing pad is not properly oriented comprises providing, for display on a user computing device, a notification that the landing pad is not properly oriented and instructions for the user to correct the orientation of the landing pad.

9. The method of claim 8, wherein the notification includes a graphical representation of a present orientation of the landing pad and a corrected orientation for the landing pad to guide the user in correcting the orientation of the landing pad.

10. The method of claim 1, wherein alerting the user that the landing pad is not properly oriented comprises activating an indicator on the ADLD to notify the user that the landing pad is not properly oriented and to indicate a direction in which to move ADLD in order to correct the orientation of the landing pad.

11. The method of claim 1, wherein registering the ADLD with a drone control platform comprises sending, to the drone control platform, data identifying the ADLD and data defining the drone approach corridor associated with the ADLD.

12. The method of claim 1, further comprising, after registering the ADLD, sending signals from the ADLD to the drone control platform that indicate that the ADLD is functioning properly.

13. The method of claim 1, further comprising, after registering the ADLD:
    determining that the airspace above the ADLD; and
    in response to determining that the airspace above the ADLD is obstructed, sending a notification to the drone control platform indicating that at least a portion of the drone approach corridor associated with the ADLD is unavailable for drones to enter.

14. A computer-implemented method for coordinating a drone approach to a landing site with an autonomous drone landing device (ADLD), the method being executed by one or more processors and comprising:
    receiving, by the one or more processors, an indication that a drone has entered an airspace associated with an ADLD, the airspace being defined, in part, by a boundary;
    receiving, by the one or more processors, first data from a sensor of the ADLD that is configured to monitor the airspace associated with the ADLD;
    receiving, by the one or more processors, orientation data that indicates an orientation of a landing pad associated with an ADLD and location data that indicates a geographic location of the ADLD;
    determining, by the one or more processors and based on the first data, a position of the drone with respect to the boundary of the airspace associated with the ADLD;
    communicating, by the one or more processors, second data to the drone to guide the drone's flight within the airspace based on the determined position of the drone with respect to the boundary of the airspace;
    determining, based on the orientation data, that the landing pad is not properly oriented for a drone to land on the landing pad; and
    in response to determining that the landing pad is not properly oriented, alerting a user that the landing pad is not properly oriented.

15. An autonomous drone landing device (ADLD) comprising:
    one or more processors;
    a data store coupled to the one or more processors having instructions stored thereon for execution by the one or more processors;
    a sensor coupled to the one or more processors, and configured to monitor airspace above the ADLD;
    a warning device coupled to the one or more processors, and configured to alert bystanders of an approaching drone; and
    one or more communication interfaces coupled to the one or more processors, and configured to communicate with a drone control platform and a drone, and
    wherein the instructions, when executed by the one or more processors, cause the one or more processors perform operations comprising:
        receiving, by the one or more processors, orientation data that indicates an orientation of a landing pad associated with an ADLD;
        determining, based on the orientation data, that the landing pad is not properly oriented for a drone to land on the landing pad; and
        in response to determining that the landing pad is not properly oriented, alerting a user that the landing pad is not properly oriented.

16. The ADLD of claim 15, wherein the operations further comprise:
    receiving, by the one or more processors, sensor data that represents airspace above an ADLD and location data that indicates a geographic location of the ADLD;
    determining, by the one or more processors, attributes to define a drone approach corridor based on the sensor data, the orientation data, and the location data; and
    registering the ADLD with a drone control platform.

17. The ADLD of claim 16, wherein the operations further comprise:
    receiving, by the one or more processors, an indication that a drone has entered an airspace associated with an ADLD, the airspace being defined, in part, by a boundary;
    receiving, by the one or more processors, first data from a sensor of the ADLD that is configured to monitor the airspace associated with the ADLD;
    determining, by the one or more processors and based on the first data, a position of the drone with respect to the boundary of the airspace associated with the ADLD; and
    communicating, by the one or more processors, second data to the drone to guide the drone's flight within the airspace based on the determined position of the drone with respect to the boundary of the airspace.

18. The ADLD of claim 16 comprising a landing pad coupled to the ADLD, wherein the landing pad comprises a drone charging station.

19. The ADLD of claim 15, wherein the operations further comprise:
    receiving, by the one or more processors, sensor data that represents airspace above an ADLD, orientation data that indicates an orientation of a landing pad associated with an ADLD, and location data that indicates a geographic location of the ADLD;
    determining, by the one or more processors, attributes to define a drone approach corridor based on the sensor data, the orientation data, and the location data;
    registering the ADLD with a drone control platform;
    receiving, by the one or more processors, an indication that a drone has entered an airspace associated with an ADLD, the airspace being defined, in part, by a boundary;
    receiving, by the one or more processors, first data from a sensor of the ADLD that is configured to monitor the airspace associated with the ADLD;
    determining, by the one or more processors and based on the first data, a position of the drone with respect to the boundary of the airspace associated with the ADLD; and
    communicating, by the one or more processors, second data to the drone to guide the drone's flight within the airspace based on the determined position of the drone with respect to the boundary of the airspace.

\* \* \* \* \*